United States Patent
Boutros et al.

(10) Patent No.: US 10,944,730 B1
(45) Date of Patent: *Mar. 9, 2021

(54) DEVICE INDEPENDENT ENCRYPTED CONTENT ACCESS SYSTEM

(71) Applicant: Snap Inc., Santa Monica, CA (US)

(72) Inventors: Jad S. Boutros, Marina de Rey, CA (US); Jiayuan Ma, Los Angeles, CA (US); Filipe Jorge Marques de Almeida, Santa Monica, CA (US); Marcel M. Yung, New York, NY (US)

(73) Assignee: Snap Inc., Santa Monica, CA (US)

( * ) Notice: Subject to any disclaimer, the term of this patent is extended or adjusted under 35 U.S.C. 154(b) by 105 days.

This patent is subject to a terminal disclaimer.

(21) Appl. No.: 16/421,048

(22) Filed: May 23, 2019

Related U.S. Application Data

(63) Continuation of application No. 15/398,564, filed on Jan. 4, 2017, now Pat. No. 10,341,304.

(51) Int. Cl.
  *H04L 29/06* (2006.01)
  *H04W 12/06* (2021.01)
  *G06F 21/62* (2013.01)
  *H04L 9/32* (2006.01)
  *H04W 12/04* (2021.01)
  (Continued)

(52) U.S. Cl.
  CPC ...... *H04L 63/0428* (2013.01); *G06F 21/6218* (2013.01); *H04L 63/06* (2013.01); *H04L 63/083* (2013.01); *H04W 12/06* (2013.01); *H04L 9/0822* (2013.01); *H04L 9/0861* (2013.01); *H04L 9/14* (2013.01); *H04L 9/3226* (2013.01); *H04L 9/3247* (2013.01); *H04L 9/3271* (2013.01); *H04L 2209/80* (2013.01); *H04M 1/72519* (2013.01); *H04W 12/04* (2013.01)

(58) Field of Classification Search
  None
  See application file for complete search history.

(56) References Cited

U.S. PATENT DOCUMENTS 6,038,295 A    3/2000  Mattes
6,980,909 B2  12/2005  Root et al.
(Continued)

FOREIGN PATENT DOCUMENTS

CA    2887596 A1    7/2015

OTHER PUBLICATIONS

"U.S. Appl. No. 15/398,564, Examiner Interview Summary dated Jan. 14, 2019", 5 pgs.
(Continued)

*Primary Examiner* — Benjamin E Lanier
(74) *Attorney, Agent, or Firm* — Schwegman Lundberg & Woessner, P.A.

(57) ABSTRACT

Systems, devices, media, and methods are presented for retrieving authentication credentials and decryption keys to access remotely stored user-generated content. The systems and methods receive a first authentication credential and access a second authentication credential based on receiving the first authentication credential. The system and methods generate an authentication token and an encryption token. Based on the authentication token, the system and methods access a set of encrypted content and an encrypted content key. The systems and methods decrypt the encrypted content key using the encryption token and decrypt the set of encrypted content using the decrypted content key. At least a portion of the content is presented at the user device.

20 Claims, 9 Drawing Sheets

(51) Int. Cl.
  *H04L 9/08* (2006.01)
  *H04L 9/14* (2006.01)
  *H04M 1/725* (2021.01)

(56) References Cited

U.S. PATENT DOCUMENTS

| | | |
|---|---|---|
| 7,024,695 B1 | 4/2006 | Kumar et al. |
| 7,173,651 B1 | 2/2007 | Knowles |
| 7,411,493 B2 | 8/2008 | Smith |
| 7,535,890 B2 | 5/2009 | Rojas |
| 8,131,597 B2 | 3/2012 | Hudetz |
| 8,199,747 B2 | 6/2012 | Rojas et al. |
| 8,332,475 B2 | 12/2012 | Rosen et al. |
| 8,718,333 B2 | 5/2014 | Wolf et al. |
| 8,724,622 B2 | 5/2014 | Rojas |
| 8,874,677 B2 | 10/2014 | Rosen et al. |
| 8,909,679 B2 | 12/2014 | Root et al. |
| 8,995,433 B2 | 3/2015 | Rojas |
| 9,040,574 B2 | 5/2015 | Wang et al. |
| 9,055,416 B2 | 6/2015 | Rosen et al. |
| 9,100,806 B2 | 8/2015 | Rosen et al. |
| 9,100,807 B2 | 8/2015 | Rosen et al. |
| 9,191,776 B2 | 11/2015 | Root et al. |
| 9,204,252 B2 | 12/2015 | Root |
| 9,443,227 B2 | 9/2016 | Evans et al. |
| 9,489,661 B2 | 11/2016 | Evans et al. |
| 9,491,134 B2 | 11/2016 | Rosen et al. |
| 10,341,304 B1 | 7/2019 | Boutros et al. |
| 2005/0169118 A1 | 8/2005 | You et al. |
| 2006/0173794 A1 | 8/2006 | Sellars et al. |
| 2008/0082449 A1 | 4/2008 | Wilkinson et al. |
| 2011/0202598 A1 | 8/2011 | Evans et al. |
| 2012/0209924 A1 | 8/2012 | Evans et al. |
| 2013/0152174 A1 | 6/2013 | Raley et al. |
| 2016/0105411 A1 | 4/2016 | Vallieres et al. |

OTHER PUBLICATIONS

"U.S. Appl. No. 15/398,564, Non Final Office Action dated Oct. 10, 2018", 12 pgs.

"U.S. Appl. No. 15/398,564, Notice of Allowance dated Feb. 20, 2019", 9 pgs.

"U.S. Appl. No. 15/398,564, Response filed Jan. 11, 2019 to Non Final Office Action dated Oct. 10, 2018", 12 pgs.

Leyden, John, "This SMS will self-destruct in 40 seconds", [Online] Retrieved from the internet: <URL: http://www.theregister.co.uk/2005/12/12/stealthtext/>, (Dec. 12, 2005), 1 pg.

DEVICE INDEPENDENT ENCRYPTED CONTENT ACCESS SYSTEM

PRIORITY

This application is a continuation of and claims the benefit of priority of U.S. patent application Ser. No. 15/398,564, filed on Jan. 4, 2017, which is hereby incorporated by reference herein in its entirety.

TECHNICAL FIELD

Embodiments of the present disclosure relate generally to secure storage and retrieval of user-generated content. More particularly, but not by way of limitation, the present disclosure addresses systems and methods for generating and distributing encryption and authentication tokens enabling access to secure user-generated content independent of a user device used to retrieve the content.

BACKGROUND

Computing devices and applications can provide communication between multiple users using a variety of media, such as text, images, sound recordings, or video recording. Computing devices and applications can also provide access to user-generated content. Access to content generated by a specified user is often enabled based on a device association with the user. For example, video or audio content generated by a user of a computing device may be stored locally on the device. The locally stored content may be accessible to the user while interacting with the computing device.

Some computing devices and applications allow for remote storage of user-generated content, such as on a cloud computing device. These remote storage solutions often store content in association with a user account. A user attempting to access the user-generated content usually signs in to the account using user-generated information such as a login identification and a password or passphrase. Systems relying on user-generated passwords or passphrases are often vulnerable to attacks on the passwords or passphrases, compromising the user-generated content stored remotely from the computing device of the user. Accordingly, there is still a need in the art to improve storage of user-generated content which is independent of a user's computing device and accessible to the user alone. Further, there is a need in the art to improve remote storage of user-generated content using strong encryption while protecting against unauthorized access attempts against the user's computing device, user authentication credentials, and the stored user-generated content.

BRIEF DESCRIPTION OF THE DRAWINGS

Various ones of the appended drawings merely illustrate example embodiments of the present disclosure and should not be considered as limiting its scope.

Figure 1:
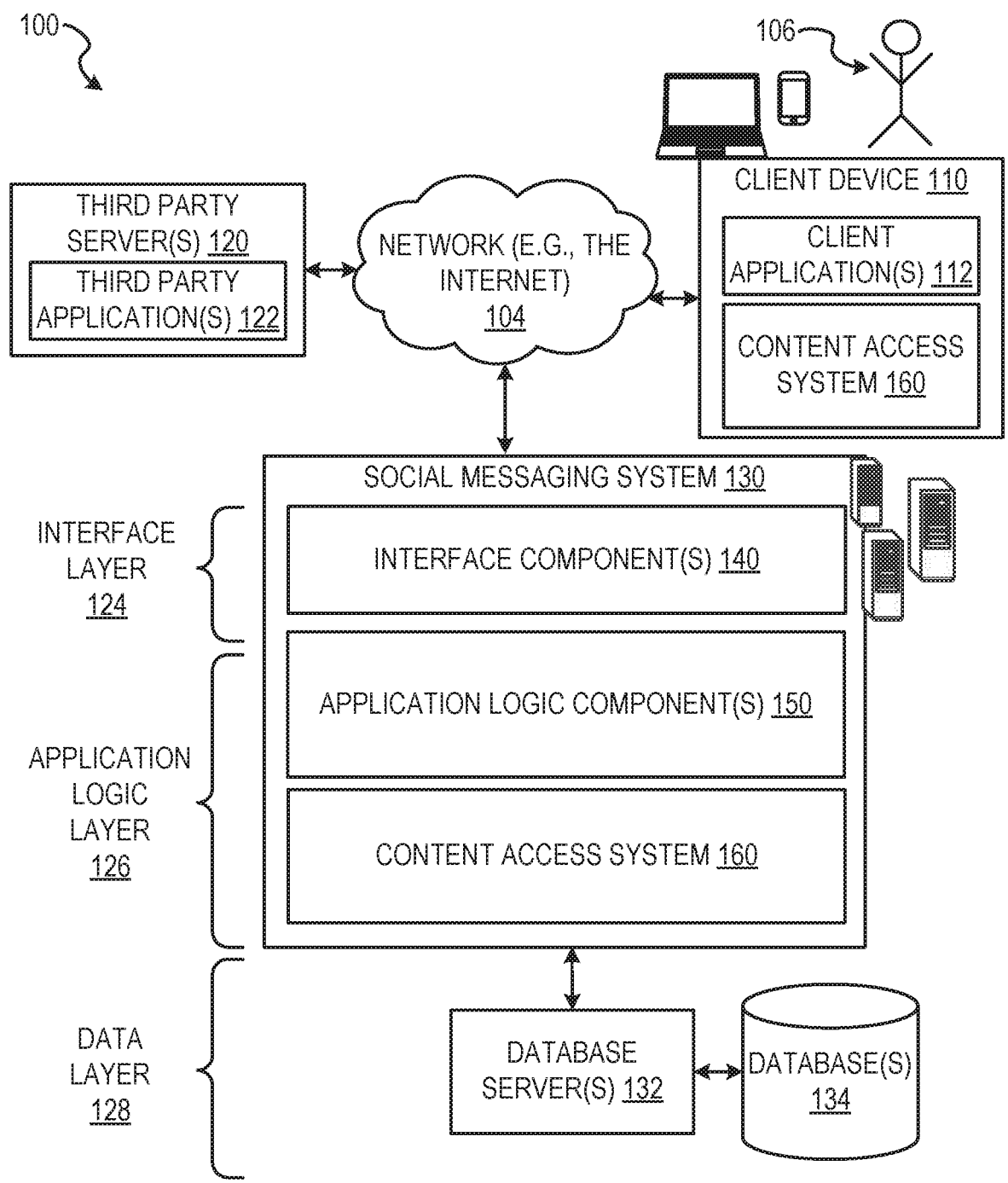
FIG. 1 is a block diagram illustrating a networked system, according to some example embodiments.

The headings provided herein are merely for convenience and do not necessarily affect the scope or meaning of the terms used.

DETAILED DESCRIPTION

Embodiments of the present disclosure relate generally to secure storage and retrieval of user-generated content. More particularly, but not by way of limitation, the present disclosure addresses systems and methods for generating and distributing encryption and authentication tokens enabling access to secure user-generated content independent of a user device used to retrieve the content. The description that follows includes systems, methods, techniques, instruction sequences, and computing machine program products illustrative of embodiments of the disclosure. In the following description, numerous specific details are set forth in order to provide an understanding of various embodiments of the inventive subject matter. It will be evident to those skilled in the art that embodiments of the inventive subject matter may be practiced without these specific details. In general, well-known instruction instances, protocols, structures, and techniques are not shown in detail.

Systems, computing devices, and applications have been developed to store user-generated content remotely from user devices which generated the content. For example, mobile phones and smartphones access cloud computing systems to upload image, text, video, and audio files created at the respective phone by a user. Some of these systems have stored user-generated content in clear text, enabling the system storing the user-generated content to have direct access. Such systems lack security and encryption suitable to ensure that access to the content is limited to the user associated with or responsible for generating the content.

Some systems have stored user-generated content in encrypted data structures. Some of these encryption-enabled systems employ user-generated passphrases (e.g., passwords) to access or decrypt the user-generated content. Passphrase systems are often limited in security provided and encryption strength. The limited encryption, used for encrypting content or keys to access content, has a strength based on the length or complexity of user-generated passphrases which the user must remember. These systems may also be vulnerable to attack on the passphrase, such as by dictionary attacks. Some remote storage systems employ stronger encryption with a strong key. These keys are often stored on the user's computing device. Storing or tethering the key to the computing device prevents device mobility, limiting a user to accessing the user-generated content with the device containing the strong key.

Embodiments described herein detail systems and methods for secure storage of user-generated content, which enable access by a user responsible for creating the content from any suitable device accessible by the user. Such systems may employ strong encryption to protect content and strong encryption of encryption/decryption keys for accessing and securing the user-generated content. Such systems may also provide security from attacks on authentication credentials for a user accessing their content, while allowing the user to generate a portion of the authentication credentials which are memorable to the user. Further, embodiments of the present disclosure enable server portability as well as user device portability or mobility. Such systems may enable migration of content and keys from one server or set of servers to a second server or set of servers, enabling independence from proprietary server, network, or cloud implementations. In some embodiments, when a hosted storage subsystem already exists, which has a user authentication component, a storage component serving users exists, and components of cryptographic authentication for servers employing secure channel communication and server digital signatures exist, the presently described systems act as a secure system on top of these existing components and exploit their cryptographic components rather than adding superfluous cryptography and new components of the same function of the existing ones, which will slow down the system and increase its cost.

The systems and methods described in the present disclosure enable protection of user-generated content (e.g., data) stored remotely from a user computing device used to generate or capture the content. These systems and methods may employ a plurality of servers or network resources on which portions of content (e.g., encrypted user-generated content) and portions of authentication credentials are distributed. In some embodiments, the systems and methods use derived authentication and encryption credentials. These authentication and encryption credentials (e.g., authentication tokens and encryption tokens) are derived or generated using credential elements distributed across one or more of the servers and computing devices (e.g., a user device) accessing or comprising the system. In some instances, at least one authentication element (e.g., a first authentication credential or a first authentication element) is held or remembered by the user. The first authentication element may be used to retrieve other authentication elements and derive authentication and encryption tokens used to access encrypted user content and encrypted or secured encryption keys used to access the encrypted content.

As described by embodiments of the present disclosure, a user may capture a video, image, or other information with an application on a smartphone. Portions of the systems and methods of the present disclosure, such as the application, may encrypt the video or other information. The encrypted video or other information prevents other users without an encryption key from accessing and viewing the video. The encryption key, used to encrypt and decrypt the video, may be generated by the system using information provided by the user and information obtained from a key server. The system may also generate one or more token to encrypt the encryption key using information provided by one or more of the servers.

The smartphone may then transmit the encrypted video and the encrypted key to a content server for secure storage, and transmit tokens to the key server. When the user subsequently logs in to the application, using the same smartphone or another device, the identity of the user is verified and authenticated by the application. The smartphone or other device, using the application, generates tokens to decrypt the encryption key. In some embodiments, the smartphone generates the tokens with the aid of the servers. The device retrieves the encrypted key and the encrypted video from the content server and decrypts the encryption key and then the video. The smartphone or other device then displays the video for user.

As explained in more detail below, when first using the systems described herein, a user chooses or generates login information (e.g., a personal identification number, a password, or a passphrase). The system authenticates the user to a key server and a content server using the login information and associates the user with the login information on the servers. The user generates, provides, or is assigned a master key (e.g., a content key) for encrypting content generated by the user. The system generates an authentication token and an encryption token. The encryption token is used to encrypt the master key, which is then deposited or stored on the content server and the key server in the encrypted form. In some embodiments, prior to depositing the encrypted master key, content generated by the user on a device is encrypted. The encrypted content is deposited or stored on the content server and the encrypted master key is deposited or stored along with the encrypted content, such that the two sets of information are associated.

At a later login, the device requests information from the key server, using the login information. The device also requests the user's content from the content server. The request to the content server may be based on one or more of the login information and the information retrieved from the key server or derived from the information received from the key server. Upon receiving encrypted content and the encrypted master key from the content server and from the key server, the system decrypts the master key locally, with the device operated by the user. The device then decrypts the content using the decrypted master key, and presents at least a portion of the decrypted content to the user on the user's device.

In some embodiments, a user interacting with the system may transmit user-generated content (e.g., images, text files, video clips, and audio clips) for encryption and storage by the system. The user may then access the content. Upon initiating content access, the systems and methods transmit the content, encrypted on a server or network asset, to a computing device operated by the user. The computing device may decrypt the content locally. The retrieval, decryption, and presentation of the content at the computing device operated by the user is performed automatically in response to an access request by the user. In such embodiments, the user has exclusive access to content associated with that user. The user may access the content from differing devices. Servers, system components, and other users are prevented from accessing the content. System components (e.g., servers, network assets, and computing devices) of the system may be changed, or content and data migrated therebetween, without restricting access of the user to the content. Precluding restriction of access may reduce access limitations to below a threshold access level, access time, or other suitable access metrics.

In some embodiments, portions of content requested and transmitted to the user are encrypted, while other portions of content are unencrypted. Unencrypted content may be provided by the system, the user, other users, third parties, combinations thereof, or any suitable source. In some instances, the user determines the content to be encrypted and the content which remains unencrypted. The determination of content encryption status may be manually selected by the user. In some embodiments, the content encryption status is automatically determined based on preferences (e.g., content use or content generation rules) established by the user. Such preferences may correspond to location of content creation, media type (e.g., image, video, or audio) of the content, time of content creation, device identification, an application or program used to generate the content, combinations thereof, or any other suitable preference type. The content encryption status may be automatically determined based on characteristics of the content being generated. In these embodiments, the subject matter of the content determines the encryption status. In such embodiments, portions of the systems and methods disclosed herein, which operate on or within the user computing device, determine an identification, subject, description, or other characteristics associated with (e.g., depicted within or represented by) the content. Based on the characteristics of the content, the user's computing device may locally encrypt the content and transmit the content to a storage location (e.g., a system component or network resource) of the presently described system.

In some embodiments, the systems and methods described herein manage keys and authentication credentials or portions thereof used to access and encrypt/decrypt information used by or provided by the system. In some instances, each piece, portion, or file of user-generated content is encrypted with a distinct encryption key (e.g., a content key). In such instances, a set of content keys comprise the distinct encryption keys encrypting the content of a user. Content keys included in the set of content keys may be encrypted with a master key (e.g., an encryption key common to all of the content keys for a specified user). In some embodiments, the encrypted content keys may be attached or otherwise associated with the content they encrypt. The master key may be locked by one or more tokens. In some embodiments, the master key is locked such that the master key is recoverable by the computing device operated by the user. The one or more tokens may be distributed in a manner that enables the user to recover the tokens and generate or unlock the master key to initiate retrieval of the content and content keys. In some embodiments, recovering the tokens is initiated by entry of a memorizable passphrase (e.g., a password, a passphrase, a pin number, or a value known to the user). Although described with respect to distinct keys used to encrypt each user-generated content file, in some embodiments, the system encrypts user-generated content associated with a specified user with a single key for that user.

In some embodiments, the system includes a key server or key management server. In some instances, the key server may be a third-party server or operated by a third party. The key server may be a server or network resource distinct from the content server storing the encrypted content and the computing device operated by the user. In embodiments in which the key server is a third party, a three-party secure computation protocol may be used between the user, the content server, and the key server. The three-party secure computation protocol may be performed automatically such that entry of the memorizable passphrase initiates one or more operations to generate, derive, or otherwise unlock the master key. In some instances, the passphrase is entered into an application or user interface presented at the computing device, and may cause retrieval of an authentication credential from the key server. The user's computing device may generate or derive the master key using one or more of the passphrase and the authentication credential retrieved from the key server. The computing device may then retrieve the encrypted content and encrypted content keys from the content server, and locally decrypt the content for presentation at the computing device.

In some instances the passphrase may be replaced by or augmented with a secret (e.g., a value, subsequent passphrase, password, or other suitable credential) which is maintained secretly written in a printed or electronic form by a human or an electronic device. Credentials, tokens, keys, and signatures herein may contain or be composed of strings of binary digits. Similarly, credentials, tokens, keys, and signatures may be understood as other symbols, using an agreed upon representation scheme (e.g., ASCII). In some embodiments, cryptographic mechanisms used in the present disclosure may be standard cryptographic processes understood by one skilled in the art. For example, the system may use symmetric key cryptography. Some embodiments of the present disclosure have been described with respect to such mechanisms, as examples, like: encryption and decryption functions, and key derivation functions, while in some other embodiments other similar functions can be used without limitations. It should be understood that any suitable cryptographic processes may be used in or by the inventive concepts described by the present disclosure.

FIG. 1 is a network diagram depicting a network system 100 having a client-server architecture configured for exchanging data over a network, according to one embodiment. For example, the network system 100 may be a messaging system where clients store data at the server and clients communicate and exchange data within the network system 100. The data may pertain to various functions (e.g., sending and receiving text and media communication, determining geolocation, etc.) and aspects (e.g., transferring communications data, receiving and transmitting indications of communication sessions, etc.) associated with the network system 100 and its users. Although illustrated herein as client-server architecture, other embodiments may include other network architectures, such as peer-to-peer network environments, distributed network environments, client and cloud-server networks, or any other suitable network where the network is a combination of wireless and wired sub-networks.

As shown in FIG. 1, the network system 100 includes a social messaging system 130. The social messaging system 130 is generally based on a three-tiered architecture, consisting of an interface layer 124, an application logic layer 126, and a data layer 128. As is understood by skilled artisans in the relevant computer, mobile application, and Internet-related arts, each component or engine shown in FIG. 1 represents a set of executable software instructions and the corresponding hardware (e.g., memory and processor) for executing the instructions, forming a hardware-implemented component or engine, and acting, at the time of the execution of instructions, as a special-purpose machine configured to carry out a particular set of functions. To avoid obscuring the inventive subject matter with unnecessary detail, various functional components and engines that are not germane to conveying an understanding of the inventive subject matter have been omitted from FIG. 1. Of course, additional functional components and engines may be used with a social messaging system, such as that illustrated in FIG. 1, to facilitate additional functionality that is not specifically described herein. Furthermore, the various functional components and engines depicted in FIG. 1 may reside on a single server computer or client device, or may be distributed across several server computers or client devices in various arrangements. Moreover, although the social messaging system 130 is depicted in FIG. 1 as a three-tiered architecture, the inventive subject matter is by no means limited to such an architecture.

As shown in FIG. 1, the interface layer 124 consists of interface components (e.g., a web server) 140, which receive requests from various client-computing devices and servers, such as client devices 110 executing client application(s) 112, and third-party servers 120 executing third-party application(s) 122. In response to received requests, the interface component 140 communicates appropriate responses to requesting devices via a network 104. For example, the interface components 140 can receive requests such as Hypertext Transfer Protocol (HTTP) requests, or other web-based. Application Programming Interface (API) requests.

The client devices 110 can execute conventional web browser applications or applications (also referred to as "apps") that have been developed for a specific platform to include any of a wide variety of mobile computing devices and mobile-specific operating systems (e.g., IOS™, ANDROID™, WINDOWS® PHONE). Further, in some example embodiments, the client devices 110 form at least a part of a content access system 160 such that components of the content access system 160 configure the client device 110 to perform a specific set of functions with respect to operations of the content access system 160. The specific set of functions may be any suitable functions without limitation, such as depositing content, retrieving content, sending content via the system to sets of receiving users, and so on. In some instances, one or more servers (e.g., a portion of the social messaging system 130 and a portion of the third-party servers 120) form at least a part of the content access system 160, such that components of the content access system 160 configure the server to perform a specific set of functions with respect to operations of the content access system 160.

In an example, the client devices 110 are executing the client application(s) 112 which can, for example, include software associated with multimedia input components such as a camera, microphone, text reader, or the like. The client application(s) 112 can provide functionality to present information to a user 106 and communicate via the network 104 to exchange information with the social messaging system 130. Further, in some examples, one or more of the social messaging system 130, the third-party servers 120, and the client devices 110 execute functionality of the content access system 160 to securely store user-generated content remotely from the client device 110 (e.g., at a server forming a part of or being associated with the social messaging system 130).

Each of the client devices 110 can comprise a computing device that includes at least a display and communication capabilities with the network 104 to access the social messaging system 130, other client devices, and third-party servers 120. The client devices 110 comprise, but are not limited to, remote devices, work stations, computers, general purpose computers. Internet appliances, hand-held devices, wireless devices, portable devices, wearable computers, cellular or mobile phones, personal digital assistants (PDAs), smart phones, tablets, ultrabooks, netbooks, laptops, desktops, multi-processor systems, microprocessor-based or programmable consumer electronics, game consoles, set-top boxes, network PCs, mini-computers, and the like. User 106 can be a person, a machine, or other means of interacting with the client devices 110. In some embodiments, the user 106 interacts with the social messaging system 130 via the client devices 110. The user 106 may not be part of the networked environment, but may be associated with the client devices 110.

As shown in FIG. 1, the data layer 128 has database servers 132 that facilitate access to information storage repositories or databases 134. The databases 134 are storage devices that store data such as member profile data, social graph data (e.g., relationships between members of the social messaging system 130), image modification preference data, accessibility data, and other user data.

An individual can register with the social messaging system 130 to become a member of the social messaging system 130. Once registered, a member can form social network relationships (e.g., friends, followers, or contacts) on the social messaging system 130 and interact with a broad range of applications provided by the social messaging system 130.

The application logic layer 126 includes various application logic components 150, which, in conjunction with the interface components 140, generate various user interfaces with data retrieved from various data sources or data services in the data layer 128. Individual application logic components 150 may be used to implement the functionality associated with various applications, services, and features of the social messaging system 130. For instance, a social messaging application can be implemented with portions of the application logic components 150. The social messaging application provides a messaging mechanism for users of the client devices 110 to send and receive messages that include text and media content such as pictures and video. The client devices 110 may access and view the messages from the social messaging application for a specified period of time (e.g., limited or unlimited). In an example, a particular message is accessible to a message recipient for a predefined duration (e.g., specified by a message sender) that begins when the particular message is first accessed. After the predefined duration elapses, the message is deleted and is no longer accessible to the message recipient. Of course, other applications and services may be separately embodied in their own application logic components 150.

As illustrated in FIG. 1, the social messaging system 130 may include at least a portion of the content access system 160 capable of storing encrypted user-generated content. The content access system 160 may additionally store encrypted content keys used to encrypt the user-generated content. Similarly, the client device 110 includes a portion of the content access system 160, as described above. In other examples, client device 110 may include the entirety of the content access system 160. In instances where the client device 110 includes a portion of (or all of) the content access system 160, the client device 110 can work alone or in cooperation with the social messaging system 130 to provide the functionality of the content access system 160 described herein.

In some embodiments, the social messaging system 130 may be an ephemeral message system that enables ephemeral communications where content (e.g., video clips or images) is deleted following a deletion trigger event such as a viewing time or viewing completion. In such embodiments, a device uses the various components described herein within the context of any of generating, sending, receiving, or displaying aspects of an ephemeral message. For example, a device implementing the content access system 160 may encrypt and store ephemeral communications generated by a user. The ephemeral communications may be later retrieved by the content access system 160 and presented at the client device 110. The ephemeral communications may be deleted at a time after retrieval, after a period of no retrieval or infrequent retrieval from the social messaging system 130, or any other suitable deletion trigger.

Figure 2:
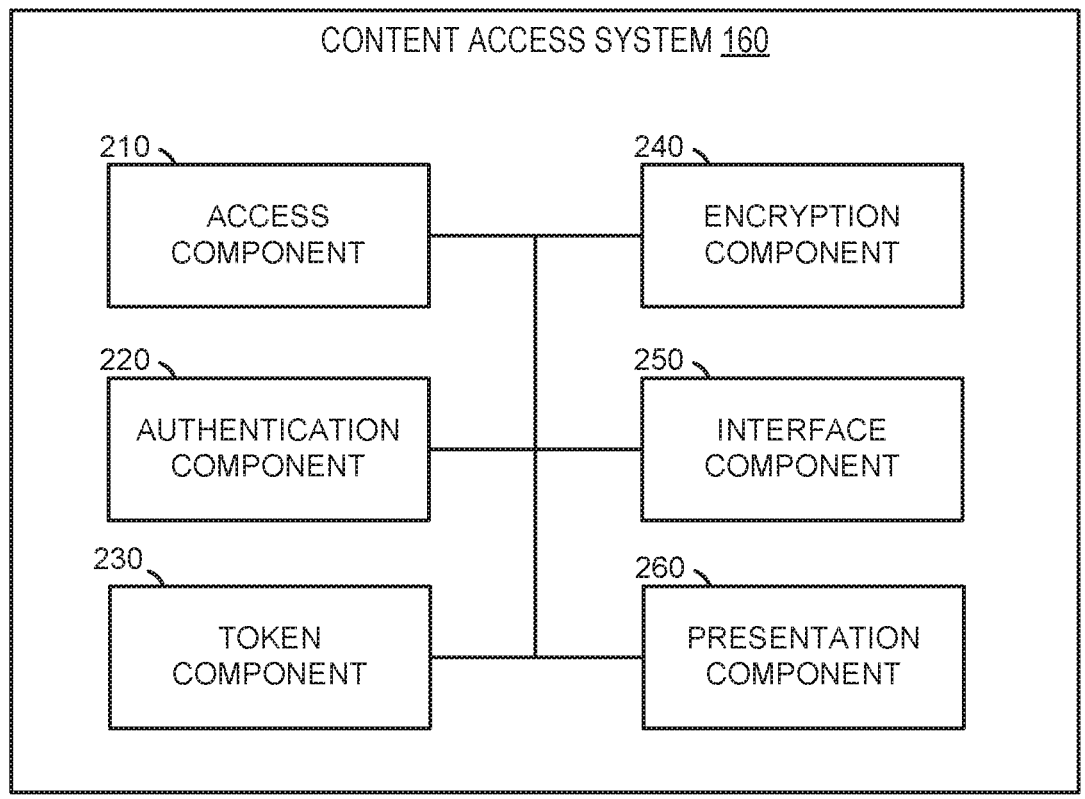
FIG. 2 is a diagram illustrating a content access system, according to some example embodiments.

In FIG. 2, in various embodiments, the content access system 160 can be implemented as a standalone system or implemented in conjunction with the client device 110, and is not necessarily included in the social messaging system 130. The content access system 160 is shown to include an access component 210, an authentication component 220, a token component 230, an encryption component 240, an interface component 250, and a presentation component 260. All, or some, of the components 210-260, communicate with each other, for example, via a network coupling, shared memory, and the like. Each component of components 210-260 can be implemented as a single component, combined into other components, or further subdivided into multiple components. Other components not pertinent to example embodiments can also be included, but are not shown.

Figure 3:
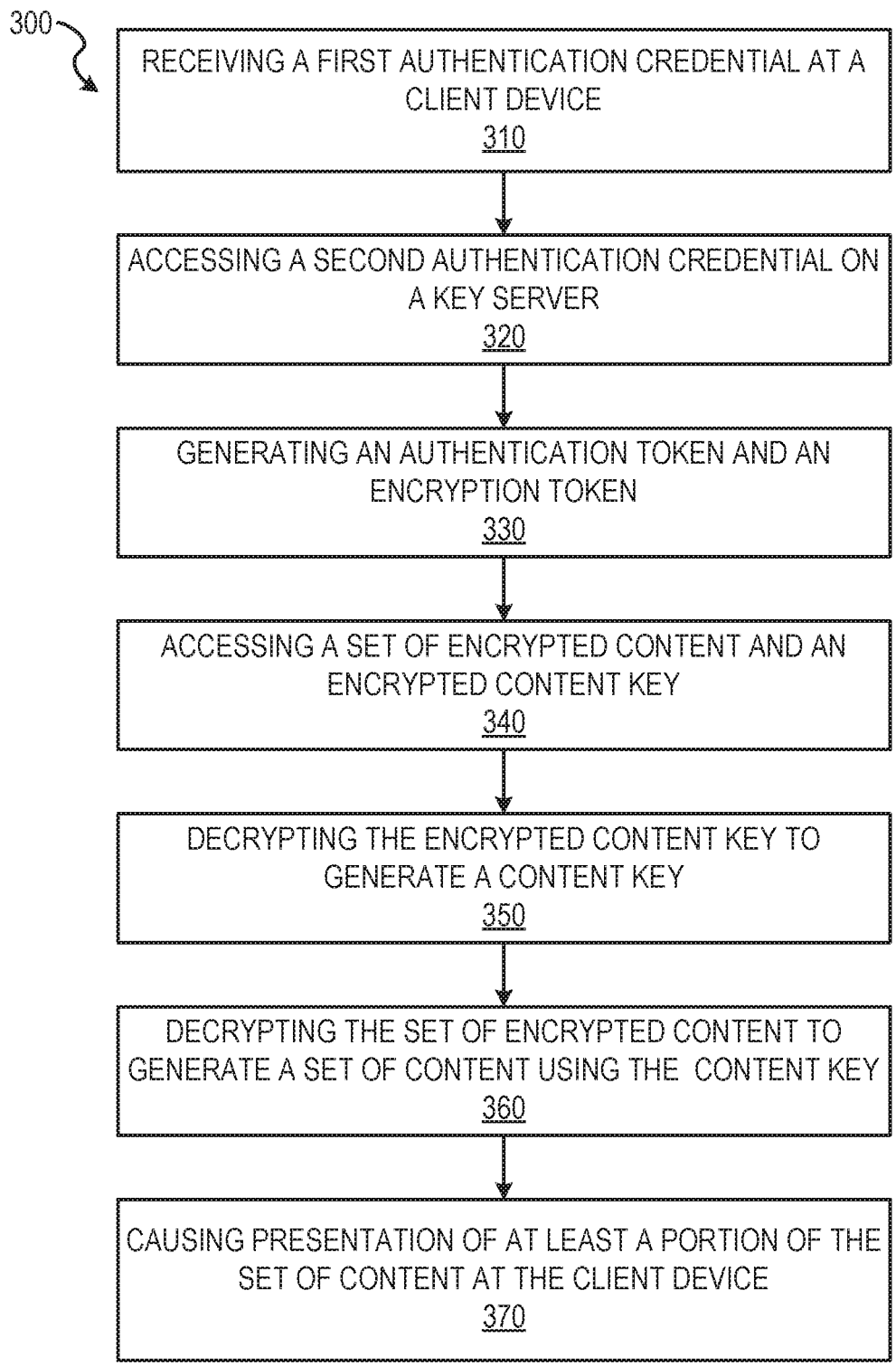
FIG. 3 is a flow diagram illustrating an example method for retrieving authentication credentials and decryption keys to access remotely stored user-generated content, according to some example embodiments.

FIG. 3 depicts a flow diagram illustrating an example method 300 for retrieving authentication credentials and decryption keys to access to remotely stored user-generated content. In some embodiments, the method 300 enables a user to get and collect elements for locally generating encryption keys and content stored remotely from the user. The method 300 may enable the user to deposit keys back to separate servers in a distributed manner, enabling retrieval and reconstruction of the keys and encrypted content, while maintaining an exclusive ability to decrypt the content. The operations of method 300 may be performed by components of the content access system 160, and are so described below for purposes of illustration.

In operation 310, the access component 210 receives a first authentication credential at the client device 110 (e.g., a user device or a computing device). The first authentication credential is associated with the user. In some embodiments, the first authentication credential is a user selected login credential received in response to a user interface element prompting entry of an authentication credential. The user interface element is generated by the interface component 250 and presented at the user device by the presentation component 260.

In some instances, the user interacting with the client device 110 initiates (e.g., opens) an application comprising a set of processor-executable instructions, which are executed by one or more processors of the client device 110. The one or more processors may be included as a component of the client device 110 or communicatively coupled thereto and configured to execute operations locally at the client device 110. In some embodiments, upon opening the application, the presentation component 260 causes presentation of a user interface. The user interface comprises a set of user interface elements selectable by the user through interaction with one or more input devices of, or communicatively coupled to, the client device 110. In some instances, a portion of the user interface elements request login credentials. The login credentials may include a user identification and a passphrase. The passphrase may comprise a password, a set of words combined to form a phrase, a string of alphanumeric characters, a value, a pin, or any other suitable information.

The access component 210 receives characters entered into the user interface elements comprising the login credentials. The access component 210 passes the login credentials to one or more components of the content access system 160. In some embodiments, the access component 210 passes the login credentials to the authentication component 220. The authentication component 220 verifies the login credentials with the application and opens at least a portion of the application such that the interface component 250 and the presentation component 260 generate and cause presentation of a subsequent user interface screen comprising a subsequent set of user interface elements.

During interaction with the application on the client device 110, the user initiates access with a content server (e.g., database server 132) containing encrypted user-generated content. The user-generated content is data (e.g., images, video, audio, document, or messages) generated by the user by interaction with a computing device (e.g., the client device 110). The user-generated content stored on the content server in encrypted form may be stored along with user-generated content which is unencrypted. The user-generated content may be encrypted at the computing device during a previous interaction with the content access system 160, and stored on the content server in response to selections made by the user instructing the content access system 160. In some instances, the selections may be in the form of a set of preferences or rules configured to automatically cause one or more of the computing device and the content access system 160 to encrypt and store the content on the content server.

In some embodiments of operation 310, upon initiating access of the encrypted user-generated content, the interface component 250 and the presentation component 260 generate and cause presentation of a set of user interface elements at a display device (e.g., a screen, a touchscreen, a heads-up display, or a projector) coupled to or forming part of the client device 110. The set of user interface elements prompt entry of the first authentication credential into one or more of the user interface elements presented at the client device 110. In some instances, the first authentication credential is a login credential (e.g., a second login credential) for accessing the content server. The second login credential may be distinct from the login credential (e.g., a first login credential) for initially accessing the application described above.

For example, the first login credential may comprise a username and password for an ephemeral messaging application associated with the social messaging system 130. The username and password may authenticate the user with the ephemeral messaging application and the social messaging system 130, without authenticating the user to the content server of the content access system 160. The second login credential may be a pin, password, passphrase, or other credential used in authenticating the user with the content server and the content access system 160. In some instances the pin, or other data, of the second login credential is associated with the username of the first login credential. In these embodiments, authenticating the user with the ephemeral messaging application, using the first login credential, passes the username to the user interface elements, prompting entry of the second login credential. Upon receipt of the second login credential (e.g., the first authentication credential), in operation 310, the access component 210 passes the first authentication credential to the authentication component 220.

In operation 320, the authentication component 220 accesses a second authentication credential stored on a key server (e.g., the third-party server 120). The key server may be a server or other network accessible machine, separated from the client device 110 and the content server. In some instances, the key server is used to aid in key management and token or key generation at the client device 110. In some embodiments, the authentication component 220 accesses the second authentication credential based on the first authentication credential being received. In some instances, the second authentication credential is a value stored at the key server and associated with the user. In such embodiments, the value is one or more random strings. The random strings may be of a predetermined length or may be generated such that the random string exceeds a threshold length. As described below, in some instances, the value comprises two user-specific random strings (e.g., strings comprising a plurality of number characters, alphanumeric characters, or any suitable values or characters). The user-specific random strings may be of a specified length (e.g., number of characters). In some instances, the length of the user-specific random strings may be determined based on a strength of encryption used for the content access system 160.

Although described with respect to a key server, it should be understood that the content access system 160 may access a plurality of second authentication credentials on a plurality of key servers. In such instances, the content access system 160 may use the plurality of second authentication credentials as described herein with respect to a single second authentication credential. Further, in some instances, a portion of the plurality of second authentication credentials may be used by the system, while other authentication credentials of the plurality of second authentication credentials are not used as described below. In some instances, the authentication component 220 authenticates the user with a first key server, using the first authentication credential, the second authentication credential is then retrieved from a second key server, using a verification from the first key server. In some instances, authentication with the first key server may be used to retrieve a plurality of second authentication credentials from a plurality of second key servers, as referenced above.

To retrieve or access the second authentication credential, in some embodiments, the authentication component 220 transmits the first authentication credential (e.g., username and pin) to the key server upon receiving the first authentication credential from the access component 210. The authentication component 220 may transmit the first authentication credential to the key server directly or in cooperation with one or more other components of the content access system 160. In some instances, the authentication component 220 transmits an indication of the first authentication credential to the key server, without transmitting all or part of the first authentication credential. In either event, the authentication component 220 authenticates the user to the key server using the first authentication credential. Authentication of the user to the key server causes the key server to transmit the second authentication credential to one or more components of the content access system 160, such as the access component 210.

In some embodiments, accessing the second authentication credential comprises one or more operations. The access component 210 transmits the first authentication credential, or an indication thereof, to the content server. The transmission of the first authentication credential is based on or in response to receiving the first authentication credential, as described in operation 310.

The access component 210 receives a session credential from the content server. The session credential indicates initiation of a present session of the user device in response to receiving the first authentication credential. The session credential may be a time-limited signed attestation indicating interaction with the content server. The time-limited attestation may indicate an affirmation, by the content server, that the user is authenticated with the content server.

The access component 210 transmits the session credential and the first authentication credential, or an indication thereof, to the key server. Access to the second authentication credential is provided or established in response to the session credential and the first authentication credential being received to the key server. In some embodiments, the key server validates the session credential, based on knowledge of the content server, a predefined session credential format, a digital signature, any other suitable information. In such embodiments, the key server may compare the session credential to an expected session credential. A match between the session credential and the expected session credential validates that the user is authenticated with the content server, and the request for the value is valid.

Upon receipt of or access to the second authentication credential, the access component 210 may pass one or more of the first authentication credential, the second authentication credential, and the session credential to one or more other components of the content access system 160. For example, as described in some embodiments below, the access component 210 passes the first authentication credential and the second authentication credential to the token component 230 for processing to retrieve, derive, or generate one or more tokens.

In some embodiments, a user replaces the first authentication credential (e.g., a passphrase) and causes the content access system 160 to replace the first authentication credential with a subsequent authentication credential and associate the subsequent authentication credential with values or keys contained at a key server or plurality of key servers. The user may login to an application on a device (e.g., the client device 110). One or more of the access component 210 and the authentication component 220 accesses the second credential (e.g., one or more values stored on a key server or plurality of key servers). The user selects a user interface element presented on a display device within a graphical user interface. Selection of the user interface element causes the application on the device to generate and cause presentation of an authentication credential replacement interface comprising one or more user interface elements configured to receive authentication credential information (e.g., one or more text entry fields). The user enters or transfers a subsequent authentication credential into the user interface elements. The authentication component 220 communicates with the key server to cause the key server to associate the subsequent authentication credential with values stored at the key server, used to generate the authentication token and the encryption token. In some embodiments, the key server generates shared values, described in more detail below, and associates the shared values with the subsequent authentication credential and the values stored in the key server used to generate tokens. In some instances, the device or the user generates or obtains shared values and transmits the shared values to the key server, which associates the shared values with the subsequent authentication credential and the values used to generate the tokens.

In operation 330, the token component 230 generates an authentication token and an encryption token. In some embodiments, the token component 230 generates the authentication token and the encryption token using at least one of the second authentication credential, the first authentication credential, and the session credential. In some embodiments, the authentication token and the encryption token are generated as cryptographic keys.

As described in more detail below, the authentication token may be used to retrieve encrypted user-generated content and encrypted content keys from the content server.

Further, as described in more detail below, the encryption token may be used to encrypt or decrypt keys used directly or indirectly to decrypt the encrypted user-generated content retrieved from the content server using the authentication token. In some embodiments, the encryption token is used to encrypt and decrypt content keys. The content keys are used to encrypt and decrypt, respectively, individual user-generated content, stored in encrypted form, on the content server. In some instances, the encryption token is used to encrypt and decrypt a master key (e.g., an encryption key) used to encrypt and decrypt, respectively, the content keys described above. In some embodiments, the encryption token encrypts the master key to generate a cyphertext master key (e.g., encrypted master key). The encryption token may encrypt the master key using one or more cryptographic functions. For example, the cyphertext of the master key (CIPH) may be generated using an algorithm represented as CIPH=AES-ENC (ET, MK), where AES-ENC is an application of AES encryption, using the encryption token (ET), to the master key (MK). Although described with respect to encryption and decryption of specified encryption keys, it should be understood that the encryption token may be used for any suitable encryption, decryption, or key management function related to the encrypted user-generated content stored on the content server.

The token component 230 may perform one or more cryptographic functions, configured to generate cryptographic tokens or keys, on the value (e.g., the user-specific random string) of the second authentication credential, to generate the authentication token and the encryption token. For example, where the second authentication credential comprises two random strings, the token component 230 may perform a first cryptographic function on a first user-specific random string to generate the authentication token, and may perform a second cryptographic function on a second user-specific random string to generate the encryption token. Although described with respect to a plurality of functions, operations, or cryptographic functions, it should be understood that the token component 230 may generate the authentication token and the encryption token using the same function, by using the function on differing values of user-specific random strings.

Generation of the authentication token and the encryption token may comprise initially calculating, creating, or otherwise processing one or more of the first authentication credential, the second authentication credential, and the session credential, using a specified function or set of functions, to create two distinct tokens. In some embodiments, the authentication token and the encryption token have previously been generated. In such embodiments, the token component 230 derives or recreates the authentication token and the encryption token by processing one or more of the first authentication credential and the second authentication credential, using the function or set of functions employed to initially create the authentication token and the encryption token. In these instances, the authentication token and the encryption token may not be stored after their initial creation. Rather, the token component 230 is configured to create tokens, using a specified process. Authentication of the user with the key server, to retrieve the second authentication credential, provides a same input to the token component 230, to derive or recreate the authentication token and the encryption token each time the user initiates access to the encrypted user-generated content stored on the content server.

In some embodiments, a master key may be replaced. In such embodiments, the first authentication credential is used to access the second authentication credential. The first authentication credential and the second authentication credential are used to retrieve the master key and all of the user-generated content stored at the content server. A replacement master key is provided. The replacement master key may be generated or obtained by the user, or may be generated or obtained by the device (e.g., the client device 110) operated by the user. The content access system 160 decrypts the content retrieved from the content server and re-encrypts the content using the replacement master key. The encryption token is used to encrypt the replacement master key, and the content access system 160 deposits the re-encrypted content and the encrypted replacement master key on the content server. In some embodiments, differing versions of a master key or differing master keys may simultaneously exist. In such embodiments, encrypted content may be comprise a tag identifying an identification of the master key (e.g., a new master key or an old master key) used to encrypt and decrypt the content.

In operation 340, the access component 210 accesses a set of encrypted content and an encrypted content key. In some embodiments, the access component 210 accesses the encrypted content and encrypted content key based on the authentication token. Upon generation (e.g., derivation or recreation) of the authentication token, the token component 230 passes the authentication token to the access component 210. The access component 210 transmits the authentication token to the content server. In some instances, the access component 210 transmits the authentication token along with the session credential used by the key server to verify that the request for the second authentication credential was valid.

In some embodiments, as will be explained in more detail below, prior to being accessed, the set of encrypted content and the encrypted content key are deposited in an encrypted state in a data structure of the content server. As described below, deposit of the set of encrypted content and the encrypted content key comprises generating the content and encrypting the content using the content key. Selecting or otherwise generating authentication and encryption tokens, the encryption token used to encrypt the content key. Dividing a capability to retrieve the keys and encrypted content across the content server, a key server, and information known to the user (e.g., a personal identification number, passphrase, or password). Dividing the retrieval capability may be performed by storing the encrypted content and encrypted content key at the content server and storing a value, used to generate the authentication token and the encryption token, at the key server. The first authentication credential (e.g., a pin, passphrase, or password) may be retained by the user, and entered into an application operating on a client device to initiate retrieval or regeneration of the authentication token and the encryption token, and subsequent retrieval of the encrypted content and the encrypted content key.

In operation 350, the encryption component 240 decrypts the encrypted content key to generate a content key. In some embodiments, the encryption component 240 decrypts the content key using the encryption token. Decryption of the content key may be performed in response to accessing the encrypted content key. In some instances, as described below in more detail, the encryption token is used to decrypt a master key, which is used to decrypt the content keys. The encryption component 240 may use any suitable decryption method or mechanism to decrypt the encrypted content key. In some embodiments, the encryption component 240 is configured to decrypt the encrypted content key using a decryption method or set of operations corresponding to an encryption method or set of operations used to encrypt the content key.

In operation 360, the encryption component 240 decrypts the set of encrypted content to generate a set of content using the content key. In some instances, the encryption component 240 decrypts a set of content keys, with each content key associated with a particular portion of encrypted user-generated content retrieved from the content server. The encryption component 240 identifies the content key associated with each encrypted content element (e.g., a file or a distinct portion or grouping of content) of the set of encrypted content. The encryption component 240 uses the content key associated with the encrypted content element to decrypt and generate the content element. In some embodiments, the content key, once decrypted, comprises a cryptographic key and an identification associating the cryptographic key with a specified content element. Each encrypted content element of the set of encrypted content may comprise cyphertext and an identification. In such instances, the identification enables association of the content element with the content key used to unlock it. In some instances, the identification for each content element is configured to identify a corresponding content key without including information identifying the subject, characteristics, or other aspects of the content element.

In operation 370, the presentation component 260 causes presentation of at least a portion of the set of content on a display device of the user device (e.g., the client device 110). The presentation component 260, alone or in combination with one or more components of the content access system 160 (e.g., the interface component 250), generates and causes presentation of a user interface or portions of a user interface suitable to display at least a portion of the set of content, after decryption. The presentation component 260 may modify an existing user interface to incorporate presentation of the portion of the set of content. For example, the presentation component 260 and the interface component 250 may generate and insert one or more frames into a user interface presented at a display device of the client device 110. The frames may be configured to receive and serve or display one or more content elements of the set of content. In some instances, the user interface or frames present a representation of a content element, such as a thumbnail. Although described with respect to specified methods of presenting the portion of the set of content, it should be understood that the presentation component 260 may present the set of content, or any portions or content elements thereof, in any suitable manner.

In some embodiments, the presentation component 260 causes presentation of one or more unsecured content along with the portion of content elements which have been decrypted by the encryption component 240. The presentation component 260 may incorporate display of the portion of the set of content into an existing display including the one or more unsecured content. In some instances, the presentation component 260 displays the unencrypted portion of the set of content in a separate display area. The separate display area may be designated by a folder, a subsequent page within a set of pages, a title, a frame, a selectable user interface element, or any other suitable manner.

The unsecured content may be content elements which were not included in the set of encrypted content. In some instances, the unsecured content is user-generated content designated by the user as public, posted on the social messaging system 130, or otherwise unselected for inclusion in the set of encrypted content. In some embodiments, the unsecured content is designated as unsecured (e.g., not included in content to be encrypted by the content access system 160) based on a set of rules or preferences of the content access system 160 or the social messaging system 130 (e.g., where an application of the social messaging system 130 was used to generate the content). The rules or preferences may be established or selected by the user, an administrator of the social messaging system 130 or the content access system 160, a device, a device manufacturer, or any other suitable party or machine. For example, the user may generate or select a rule or preference indicating that content not previously posted on the social messaging system 130 is by default included in the set of content to be encrypted. Although described with respect to content created by the user, it should be understood that in some instances, the unsecured content may be generated by parties other than the user. For example, in some instances, the unsecured content is generated by a third party (e.g., advertisements, push notifications, or user interface elements), by other users (e.g., user-generated content sent from a first user to a second user via the social messaging system 130), or any other suitable party or machine (e.g., content generated by an artificial intelligence).

In some embodiments, a plurality of content servers and a plurality of key servers are available to the user and the user may elect to replace one or more of the servers used to store the user-generated content and portions of the keys unlocking the content. In such embodiments, the content access system 160 performs one or more of the methods described in the present disclosure (e.g., method 300) to retrieve the content and keys associated with the user. One or more of the user, the device (e.g., the client device 110), and the content access system 160 selects one or more new servers (e.g., a new content server, a new key server, or combinations thereof). The content access system 160 performs one or more of the methods, described in the present disclosure, to deposit one or more of the encrypted content and encrypted content key (e.g., encrypted master key) and values or portions of keys used to retrieve and unlock the content and the content key with the selected one or more server. The information deposited on the selected one or more server corresponds to the type of server selected (e.g., a content server or a key server).

Figure 4:
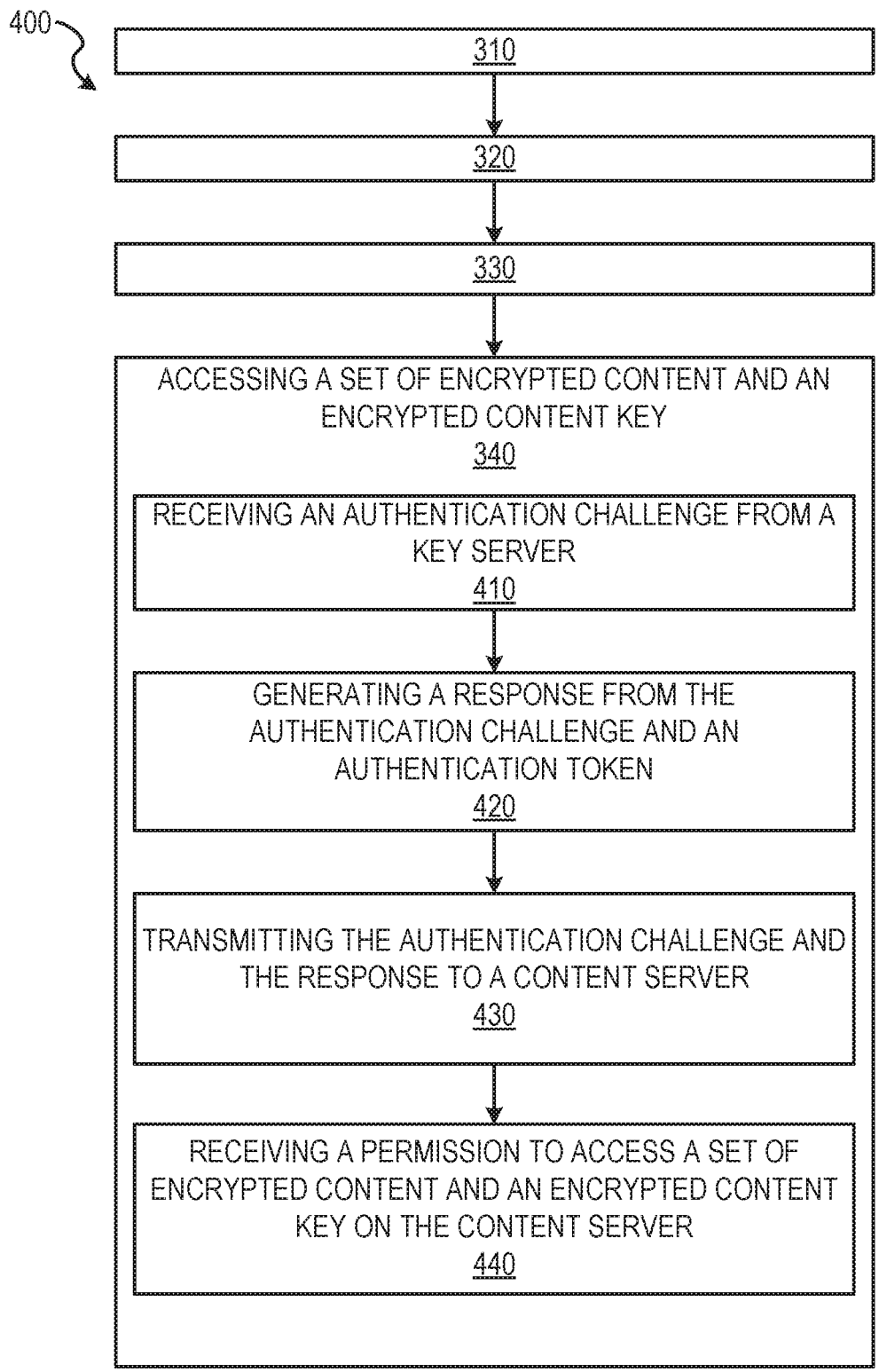
FIG. 4 is a flow diagram illustrating an example method for retrieving authentication credentials and decryption keys to access remotely stored user-generated content, according to some example embodiments.

FIG. 4 shows a flow diagram illustrating an example method 400 for retrieving authentication credentials and decryption keys to access remotely stored user-generated content. The operations of method 400 may be performed by components of the content access system 160. In some instances, certain operations of the method 400 are performed using one or more operations of the method 300 or as sub-operations of one or more operations of the method 300, as will be explained in more detail below. For example, as shown in FIG. 4, operations of the method 400 may be part or sub-operations of operation 340.

In operation 410, the access component 210 receives an authentication challenge from the key server. In some embodiments, the authentication challenge is associated with an expected response. The authentication challenge may be a time-limited and signed attestation, a digital signature, or any other suitable authentication challenge. In some embodiments, the expected response is a specified message and a signature, such as an RSA signing of the challenge message. In some instances, the expected response includes a specified message and the encryption token, generated or regenerated in operation 330.

In operation 420, the authentication component 220 generates a response from the authentication challenge and the authentication token. In some embodiments, the authentication component 220 generates the response by applying the authentication token to the authentication challenge. In some instances, the response comprises applying the authentication token to the specified message and the encryption token. For example, the response may be represented as RES=AES (ET, M), where RES is the response. AES is an application of AES encryption to the encryption token. ET, acting as the AES key, and the message, M. In some embodiments, the encryption token is the key to the AES encryption of the message.

In operation 430, the access component 210 transmits the authentication challenge and the response to the content server. The authentication challenge and the response may be transmitted to the content server from the client device 110. In some instances, the access component 210 transmits the response without the authentication challenge. In such embodiments, the content server may be configured to receive the response, where the authentication challenge of the key server is known to the content server. For example, the content server may receive or be configured to generate a challenge in the same manner as the key server. In such examples, the content server will have a valid copy of the authentication challenge to ensure the content server compares the response received in operation 430 with an expected response which is identical to that of the key server.

In some embodiments, the access component 210 transmits a digital session credential with the authentication challenge and the response. The digital session credential may be initially received from the content server. The digital session credential may be a digital signature known to the key server and the content server. In some embodiments, after receiving the first authentication credential, in operation 310, the access component 210 contacts the content server for a digital signature associated with a unique identification component validating a set of transactions (e.g., attempted access of the encrypted content). The digital signature may be configured with a time element, such that the digital signature expires after a predetermined period of time. In such embodiments, after expiration of the digital signature, the access component 210 may reinitiate an attempted access of the encrypted content by retransmitting the first authentication credential and restarting the access process or set of operations. In some instances, the access component 210 contacts the content server to retrieve a subsequent digital signature by transmitting one or more authentication credentials or tokens indicating partial completion of the methods 300 or 400 for accessing the encrypted content. Where the digital signature is included, each of the key server and content server may determine the digital signature is currently valid prior to processing the request or performing a response operation to the operations of one or more of the methods 300 or 400, performed by the content access system 160.

In operation 440, the access component 210 receives a permission to access the set of encrypted content and the encrypted content key. In some embodiments, the permission is received based on the response matching the expected response. In some instances, the permission is transmitted to the access component 210 so that a subsequent request for access to the encrypted content is authorized. In such instances, the authorization may be limited to a specified period of time, a specified number of access attempts, or a current session. In some embodiments, access permission is implicitly received by the access component 210, such that access to the set of encrypted content and the encrypted content key is enabled. In such embodiments, the access component 210 may receive the access permission in the form of a transmission of the set of encrypted content and the encrypted content key, or set of content keys, from the content server to the access component 210. In these embodiments, transmission of the set of encrypted content and the encrypted content key fulfills a request for access transmitted from the access component 210. The request for access may specify certain content elements of the set of encrypted content and certain content keys associated with the requested content elements. In such instances, the transmission, indicating successful access permission, comprises a subset of the set of encrypted content and the encrypted content key including the certain content elements and the certain content keys.

In embodiments where a digital session credential is transmitted with the authentication challenge and the response, the access component 210 receives the permission based on the response matching the expected response for the authentication challenge and the digital session credential. In such embodiments, the digital session credential, received from the content server, matches the digital session credential transmitted with the authentication challenge and the response.

Figure 5:
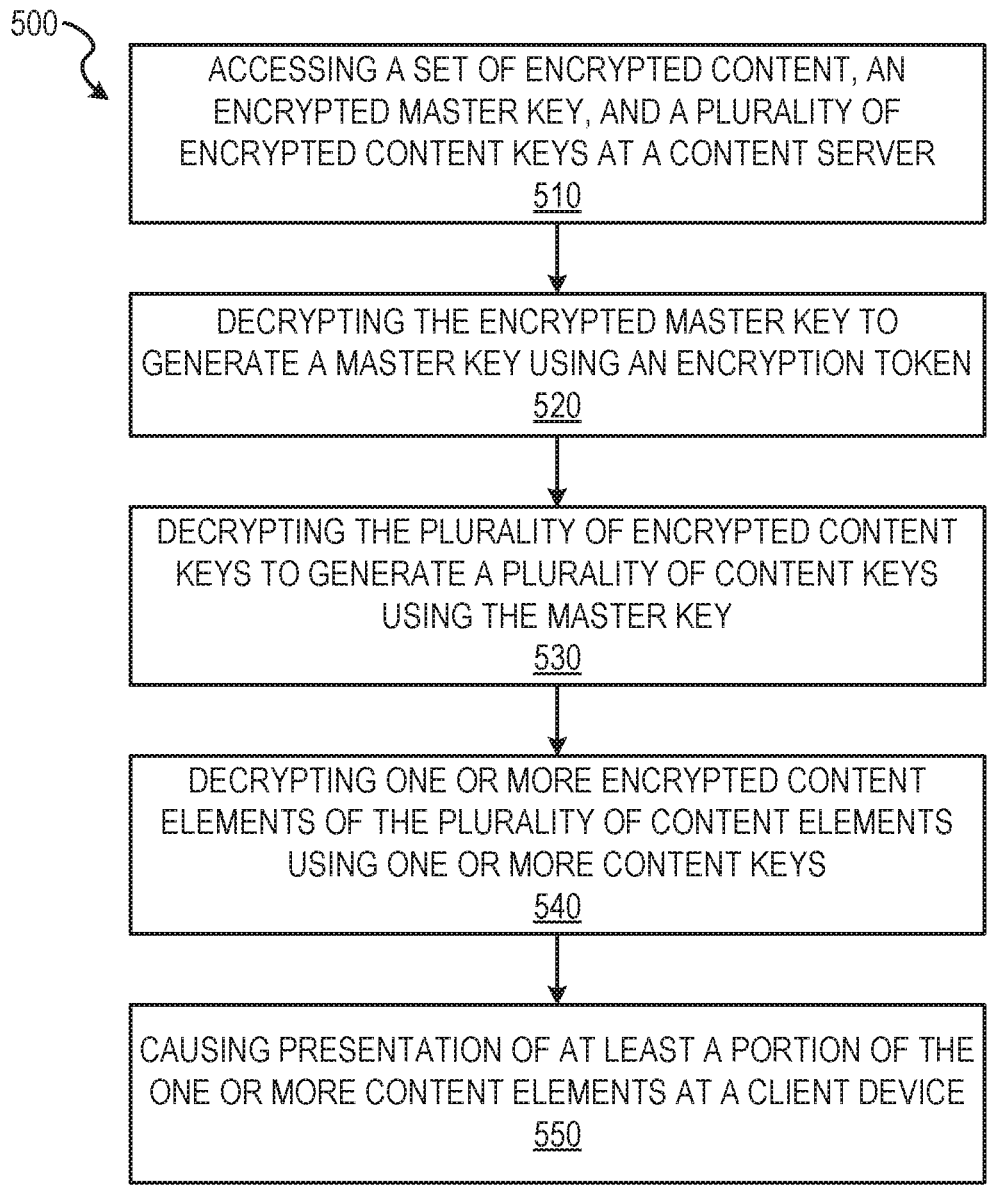
FIG. 5 is a flow diagram illustrating an example method for retrieving authentication credentials and decryption keys to access remotely stored user-generated content, according to some example embodiments.

FIG. 5 shows a flow diagram illustrating an example method 500 for retrieving authentication credentials and decryption keys to access remotely stored user-generated content. The operations of method 500 may be performed by components of the content access system 160. In some instances, certain operations of the method 500 are performed using one or more operations of one or more of the methods 300 and 400 or as sub-operations of one or more operations of one or more of the methods 300 or 400, as will be explained in more detail below.

In some embodiments, as described in FIG. 5, a set of content, stored on the content server, comprises a plurality of content elements. The plurality of content elements may be a set of discrete portions of content or files stored on or otherwise accessible by the content server. In some embodiments, the content key, described above with respect to FIG. 3, is a plurality of content keys. Each content element of the plurality of content elements may be associated with a separate content key of the plurality of content keys.

In operation 510, the access component 210 accesses a set of encrypted content, an encrypted master key, and a plurality of encrypted content keys. In some embodiments, the access component 210 accesses the set of encrypted content, the encrypted master key, and the plurality of encrypted content keys in a manner similar to or the same as described above with respect to methods 300 or 400. The access component 210 may access the above-referenced data by receiving the set of encrypted content, the encrypted master key, and the plurality of encrypted content keys from the content server. The content server may transmit the data as a result of validating and authenticating a request for the data and an identity of the user requesting the data as being associated with the requested data.

In operation 520, the encryption component 240 decrypts the encrypted master key to generate a master key using the encryption token. In some embodiments, decryption of the master key is performed in response to accessing or receiving the encrypted master key. The encryption component 240 decrypts the encrypted master key using the encryption token, as generated or regenerated in operation 320. The encryption component 240 may apply the encryption token to a cyphertext of the encrypted master key, using one or more decryption operations, to generate, recover, or derive the master key. The encryption component 240 may decrypt the encrypted master key in any suitable manner, such as described above.

In operation 530, the encryption component 240 decrypts the plurality of encrypted content keys to generate a plurality of content keys using the master key. In some embodiments, decryption of the content keys is performed in response to generating the master key, as described with respect to operation 520. The encryption component 240 may decrypt the plurality of encrypted content keys by applying the master key to cyphertext of the plurality of encrypted content keys, using one or more decryption operations, to generate, recovery, or derive the plurality of content keys.

In some embodiments, the encryption component 240 accesses the plurality of encrypted content keys as a set or packet. In such instances, where the plurality of encrypted content keys are provided together, the encryption component 240 may decrypt the plurality of content keys simultaneously or in a single instance of using the one or more decryption operations. In some embodiments, the encryption component 240 accesses the plurality of encrypted content keys as distinct files, portions of a file, data, or other separate operable elements. In such embodiments, the encryption component 240 may decrypt one or more of the plurality of encrypted content keys separately. The encryption component 240 may decrypt certain or specified content keys based on requests or access attempts for corresponding certain or specified content. For example, where a user attempts to access a first content element of the set of encrypted content, a first content key, associated with the first content element, may be decrypted by the encryption component 240 using the master key. In such examples, subsequent content keys of the plurality of encrypted content keys may be decrypted on demand for content associated with those content keys.

In operation 540, the encryption component 240 decrypts one or more encrypted content elements of the plurality of content elements using one or more content keys of the plurality of content keys. The one or more content keys used to decrypt the one or more content elements are associated with the one or more encrypted content elements. In some instances, the encryption component 240 decrypts each of the one or more encrypted content elements in response to a request for the selected content element. The encryption component 240 may also decrypt the one or more encrypted content elements automatically, upon decryption of a content key associated with each, or one or more, of the one or more encrypted content elements. As such, the encryption component 240 may decrypt the one or more encrypted content elements in a bulk set of operations, in discrete operations based on requests, in discrete operations in response to decryption of an associated content key, or in any other suitable manner or order of operation.

In some embodiments, decrypting the one or more encrypted content elements with the one or more content keys generates one or more content elements by converting the one or more content elements from encrypted cyphertext to readable or renderable data. In some instances, the encryption component 240 decrypts each encrypted content element using a single content key associated with the content element being decrypted. In some embodiments, the encryption component 240 decrypts a plurality of encrypted content elements using a single content key associated with the plurality of encrypted content elements as a set. For example, a single content key may be associated with all of the content generated and encrypted on a specified day, for a specified time period, at a specified event, or any other suitable grouping characteristic. Although encrypted data is described with respect to cyphertext, it should be understood that the term "cyphertext" is applicable to any encrypted data type, without limitation. As such, although in some instances "cyphertext" refers to encrypted textual content, it may also refer to encrypted video, audio, or any other suitable encrypted data, data type, or format.

In operation 550, the presentation component 260 causes presentation of at least a portion of the one or more content elements on a display device of the client device 110. In some embodiments, the presentation component 260 performs operation 550 in a manner similar to or the same as described above with respect to operation 370. The presentation component 260 may cause presentation of the content elements separately as individual or sets of content elements are decrypted by the encryption component 240. The presentation component 260 may cause presentation of the content elements after all of the one or more content elements to be decrypted have been processed by the encryption component 240 and passed to the presentation component 260 as renderable data.

In some instances, the presentation component 260 causes display of a portion of the one or more content elements which are renderable within a user interface at a display device of the client device 110. In such instances, the presentation component 260 may withhold display of a subsequent portion of the one or more content elements which are not currently renderable within the user interface based on dimensions of the display device; characteristics or settings of the user interface, the display device, or the client device 110; or any other suitable display factor. In such instances, the presentation component 260 causes display of the subsequent portions of content elements in response to a change in the display factor. For example, the presentation component 260 generates pages of a user interface, populating the pages with portions of the one or more content elements to be displayed. The presentation component 260 causes presentation of subsequent portions of content elements as the user interacts with the user interface to transition between pages. Although described with respect to specified examples, the presentation component 260 may cause presentation of the one or more content elements in any suitable manner.

Figure 6:
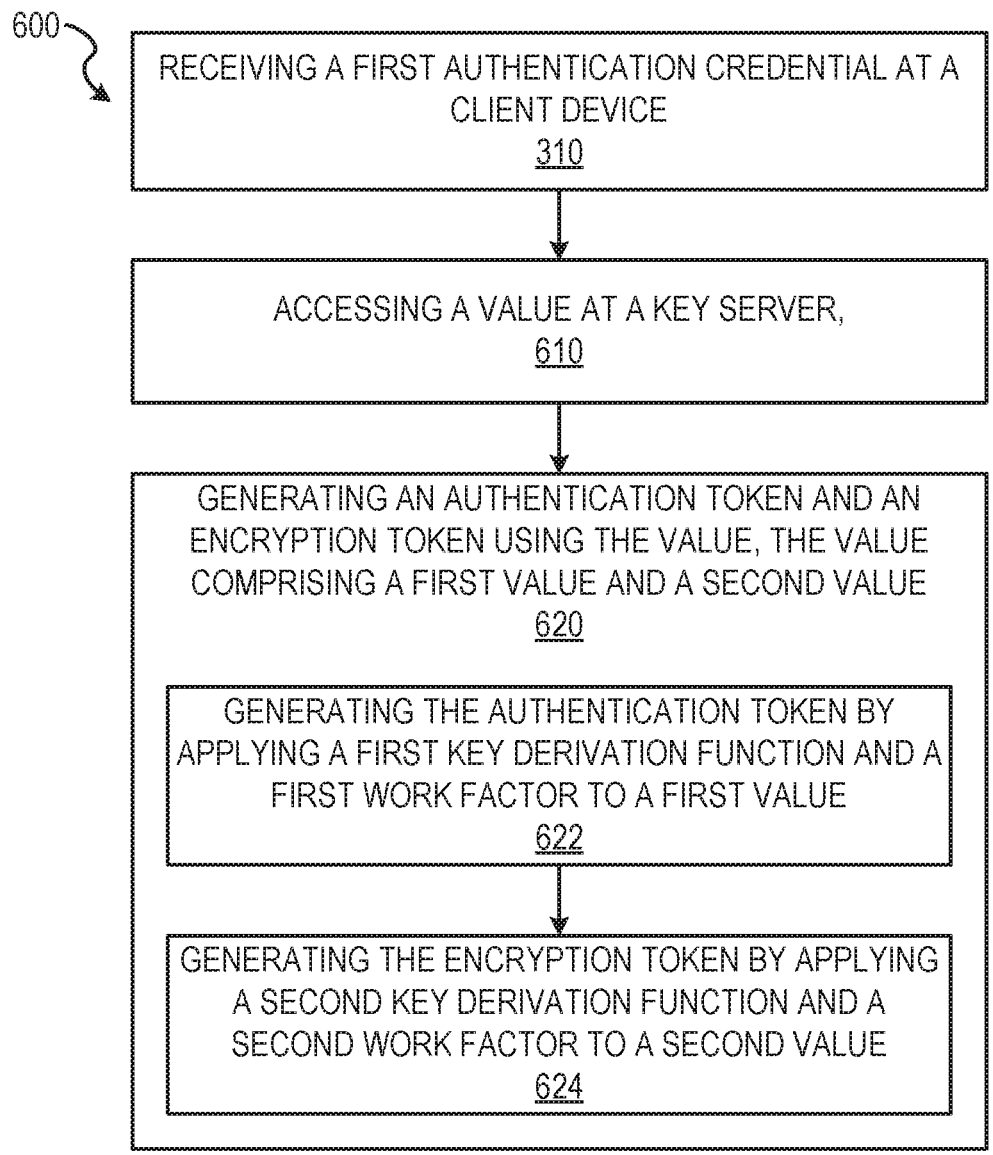
FIG. 6 is a flow diagram illustrating an example method for generating authentication credentials and decryption keys to access remotely stored user-generated content, according to some example embodiments.

FIG. 6 shows a flow diagram illustrating an example method 600 for generating authentication credentials and decryption keys to access remotely stored user generated content. The operations of method 600 may be performed by components of the content access system 160. In some instances, certain operations of the method 600 are performed using one or more operations of one or more of the methods 300, 400, or 500, or as sub-operations of one or more operations of one or more of the methods 300, 400, or 500, as will be explained in more detail below.

In operation 610, the access component 210 accesses a value at the key server. The value may be accessed in response to receiving the first authentication credential, as in operation 310. In some embodiments, the value is a random or pseudorandom string exceeding a threshold length. For example, the value may be a 128 bit, 256 bit, 512 bit, or 1024 bit random number. The value is associated with the first authentication credential in the key server. Although described with respect to a value, in some embodiments, the value comprises a first value and a second value.

Upon subsequent login, using the first authentication credential, the key server provides the value to the client device from which the first authentication credential was provided. In some embodiments, the value is generated for the user and associated with the first authentication credential by the key server, or one or more of a plurality of key servers. In some instances, the value is generated locally at the client device 110 of the user, or at another device, and transmitted to the key server, or one or more of a plurality of key servers, by the client device 110. In such instances, the key server associates the value with the first authentication credential. Where a plurality of key servers is present, a single key server may act as a gateway, generating the value or receiving the value and associating the value with the first authentication credential. The single key server may then distribute all or a portion of the value among the plurality of key servers. The single key server may also log the first authentication credential and request generation of a value or values from the plurality of key servers. Each key server may associated the value generated thereon with the first authentication credential, or a credential provided by the single key server as a substitute or proxy for the first credential.

Where the value includes or comprises a plurality of values (e.g., a first value and a second value), the plurality of values may be used in combination or separately to generate the authentication token and the encryption token. In an embodiment using a first value and a second value, each of the first value and the second value are random strings exceeding a threshold length. For example, each of the first value and the second value may be a 128 bit, 256 bit, 512 bit, or 1024 bit random number. In some embodiments, the value may be of a length or complexity exceeding a threshold length, and each of the first value and the second value may be a subset of the length. For example, the first value and the second value may be a pair of 256 bit random numbers, where the value is a 512 bit random number. Although described as a pair, it should be understood that the first value and the second value may be distinct, such that the random string comprising the first value is different than the random string comprising the second value. The difference between the first value and the second value may be in the characters comprising the two strings, a length of the strings, a combination thereof, or any other suitable difference. In operation 620, the token component 230 generates the encryption token and the authentication token. In some embodiments, the encryption token is a token for encrypting and decrypting an encryption key, the encryption and decryption being performed at the user device. In some instances, decryption and encryption of the encryption key is based, at least in part, on the value. In some embodiments, the authentication token is a token for generating a challenge response. The authentication token may be used to generate the challenge response via one or more cryptographic mechanisms. For example, the token component 230 may generate the challenge response by encrypting a challenge, decrypting a challenge, or other suitable cryptographic operation, using the authentication token. The authentication token and the encryption token may be logged by the key server, such that the authentication token is deposited with the key server and associated with the user (e.g., the first authentication credential or other identification) and a cyphertext version of the encryption token is logged as associated with the authentication token. Upon validation of the user with the authentication token, the key management server may return the cyphertext version of the encryption token to the client device from which the authentication token was received. In some instances, messages between the key server are conducted using transport layer security (TLS) with certificate pinning, such that an application to which the user has logged in is configured with a certificate or certificates to be used by one or more of the key server and the content server.

The token component 230 may generate the encryption token and the authentication token using one or more operations for generating cryptographic keys, such that each of the encryption token and the authentication token are distinct cryptographic keys. In some embodiments, the token component 230 generates the encryption token and the authentication token using one or more key derivation functions and one or more work factors associated with the derivation. A work factor is a value controlling an amount of work needed to compute a function. The work factor may indicate a number of iterations to which a function is applied to a given input, in order to generate a product of the function. For example, in some embodiments, the work factor specifies a number of times a key derivation function is to be applied to the value to generate the encryption token and the authentication token. In instances where the work factor specifics a number of iterations, the one or more key derivation functions may be initially applied to the value to generate an intermediate token (e.g., an intermediate version of one or more of the authentication token and the encryption token). Upon generating the intermediate token, the one or more key derivation functions are applied to the intermediate token to generate a second intermediate token. The process continues until the one or more key derivation functions have been applied a number of times equal to the number of iterations. In such instances, each subsequent iteration applies the one or more key derivation functions to an intermediate token generated from a previous iteration.

In some embodiments, the token component 230 may apply a first key derivation function and a first work factor to the value to generate the authentication key. The token component 230 may then apply a second key derivation function and a second work factor to the value to generate the encryption key. In some embodiments, the key derivation function used to generate the authentication key and the encryption key may be a same key derivation function, while a work factor used for the authentication key (e.g., a first work factor) differs from a work factor used for the encryption key (e.g., a second work factor). In some embodiments, the token component 230 uses different key derivation functions to generate the authentication key and the encryption key, while using a same work factor in the process of generating the distinct keys.

As in operation 622, in instances where the value comprises a first value and a second value, token component 230 generates the authentication token by applying a first key derivation function and a first work factor to the first value. In some embodiments, the first key derivation function and the first work factor are applied to the first value and the first authentication credential to generate the authentication token. In operation 624, the token component 230 then generates the encryption token by applying a second key derivation function and a second work factor to the second value. In some instances, the second key derivation function and the second work factor are applied to the second value and the first authentication credential. In some embodiments, the token component 230 generates the authentication token and the encryption token using the same key derivation function and the same work factor. In these instances, the authentication key and the encryption key differ by the key derivation function and the work factor being applied to differing values (e.g., the first value and the second value). In some instances, the token component 230 generates the authentication key and the encryption key using the same key derivation function and differing work factors applied to each of the first value and the second value.

In some embodiments, the token component 230 generates the authentication token and the encryption token using the value, or the first value and the second value, respectively, and a passphrase (e.g., a password, a passphrase, or a pin) of the user. In such embodiments, the token component 230 may generate the two tokens as cryptographic keys by applying two key derivation functions (e.g., the same key derivation function or two distinct key derivation functions), a work factor (e.g., the same work factor or two distinct work factors), and the passphrase. The authentication token may be represented as AT=KDF1(RND1, PP), where AT is the authentication token, KDF1 is a first key derivation function, RND1 is the first value, and PP is the passphrase. The encryption token may be represented as ET=KDF2 (RND2, PP), where ET is the encryption token. KDF2 is a second key derivation function, RND2 is the second value, and PP is the passphrase.

In embodiments where the value comprises a plurality of values or sub-values, the plurality of values used to generate a token (e.g., the authentication token or the encryption token) may be combined or otherwise modulated to generate new values which are shared between one or more key servers or a key server and a client device (e.g., client device 110). The shared values may be used to retrieve values used to generate or reconstruct the authentication token and the encryption token. The randomization or re-randomization of shared values may neutralize situations where a portion of the values are compromised. For example, one or more of the values may be combined using an exclusive or for all values. One or more values may be combined by adding them using a modulo operation, or by adding them using a modulo operation to a prime number exceeding a predetermined length threshold. One or more of the values may be concatenated using a cryptographic hash function, or other suitable function.

In such embodiments, a crypographic hash function, such as SHA-1. SHA256, or an AES-based-MAC function, may be applied to one or more of the values. For example, the cryptographic function may treat one string as a key and the rest of the values as messages to be encrypted or hashed. Such a concatenation may be represented as RND1=H(RND(S1)1, . . . RND(Sn)1) and RND2=H(RND(S1)2, . . . , RND(Sn)2), where RND1 represents a first hash result or cyphertext of values. RND2 represents a second hash result, and H represents a cryptographic hash function. RND(S1)1 represents a first value of the plurality of values and RND(Sn)1 represents an nth value of the plurality of values, where these values are used as values, or combined to form a single value, used to generate the authentication token. RND(S1)2 represents a second value of the plurality of values and RND(Sn)2 represents an nth value of the plurality of values, where these values are used as values, or combined to form a single value, used to generate the encryption token.

In some embodiments, a point (i, RND(Si)1) is treated as a point on a polynomial in a finite field. The finite field includes elements of a size exceeding a specified threshold or of sufficient size. For example, the finite field may include 256 bits if a 256 bit prime number is used as an order of the finite field. A polynomial interpolation may be used as a cryptographic function for the plurality of values. In some instances, if all n points in the finite field are random, the resulting polynomial is of degree n−1 and a provided value at point zero is RND1. For other points, another polynomial may be determined to define RND2. In some embodiments, the polynomial interpolation may be performed in the finite field modulo a prime number p. In some instances, all of the points are retrieved to recover a polynomial P, represented by a set of coefficients A0, A1, . . . An−1, where Ai are values in the field. In such instances, the value used to generate a token may be a value of the polynomial at point 0 (e.g., A0).

In some embodiments, a smaller degree polynomial is used. For example, a polynomial of degree k−1, smaller then RND(Si), may be used. The polynomial may be determined by a portion of a plurality of key servers and interpolated to polynomial P, described above. The remaining n-k points may be derived by evaluating the polynomial on points k+1, k+2, . . . n to generate points that are (k+1, P(k+1), (k+2, P(k+2)) . . . (n, P(n)). In such embodiments, only k servers of the plurality of key servers may be active in retrieval of the value used to generate or reconstruct an authentication token or an encryption token. The subset of key servers (e.g., k servers) may provide enough points to interpolate the polynomial and calculate the value, represented as P(0).

Some of the above-referenced embodiments enable one or more key server to re-randomize values which are shared between key servers or between a key server and a client device (e.g., client device 110), without changing the values used to generate or reconstruct the authentication token or the encryption token. For example, a user, or a client device being used by the user, may select a random point, adding to zero modulo p. A key server, or a portion of the plurality of key servers, may add the new value modulo p to a previous value.

Once the authentication token and the encryption token are generated, one or more components of the content access system 160 may deposit the authentication token and a cyphertext version of the encryption token with the key server. The key server may validate a signature for the user, and log the authentication token and the cyphertext encryption token as being associated with the user. In such instances, the authentication token and cyphertext encryption token may later be provided to the user to unlock the encryption token, and to use the authentication token and the encryption token to authenticate the user with the key server and the content server to retrieve encrypted content stored on the content server. In some instances, the authentication token and the encryption token, after being generated and associated with the user, may be used by portions of the content access system 160 residing on a client device, to encrypt content generated by the user. The content may be generated in an unencrypted form, such as clear text. Encryption of the content produces a cyphertext version of the content, encrypted content, to be securely stored by the content access system 160. The encrypted content may then be stored on one or more servers, such as the content server. In some embodiments, the value, or the first value and the second value, may be logged and associated with the user. In such embodiments, the value or the first and second values may later be provided to the user to re-derive or regenerate the authentication token and the encryption token for authenticating the user with the key server and the content server to retrieve encrypted content stored on the content server.

In some embodiments, once the encryption token and authentication token are generated and associated with the user, and an encryption key, later encrypted by the encryption token, is used to encrypt content generated by the user, the user may be able to request removal of the content from the content server. In some instances, a content removal request is accompanied by an indication of authentication, generated upon the user validating an identity with the authentication credentials and the authentication token. The content removal request may be subject to a delay to ensure the user time to rescind the request.

Modules, Components, and Logic

Certain embodiments are described herein as including logic or a number of components, modules, or mechanisms. Components can constitute hardware components. A "hardware component" is a tangible unit capable of performing certain operations and can be configured or arranged in a certain physical manner. In various example embodiments, a computer systems (e.g., a standalone computer system, a client computer system, or a server computer system) or hardware components of a computer system (e.g., at least one hardware processor, a processor, or a group of processors) is configured by software (e.g., an application or application portion) as a hardware component that operates to perform certain operations as described herein.

In some embodiments, a hardware component is implemented mechanically, electronically, or any suitable combination thereof. For example, a hardware component can include dedicated circuitry or logic that is permanently configured to perform certain operations. For example, a hardware component can be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component can include software encompassed within a general-purpose processor or other programmable processor. It will be appreciated that the decision to implement a hardware component mechanically, in dedicated and permanently configured circuitry, or in temporarily configured circuitry (e.g., configured by software) can be driven by cost and time considerations.

Accordingly, the phrase "hardware component" should be understood to encompass a tangible entity, be that an entity that is physically constructed, permanently configured (e.g., hardwired), or temporarily configured (e.g., programmed) to operate in a certain manner or to perform certain operations described herein. As used herein. "hardware-implemented component" refers to a hardware component. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software can accordingly configure a particular processor or processors, for example, to constitute a particular hardware component at one instance of time and to constitute a different hardware component at a different instance of time.

Hardware components can provide information to, and receive information from, other hardware components. Accordingly, the described hardware components can be regarded as being communicatively coupled. Where multiple hardware components exist contemporaneously, communications can be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component performs an operation and stores the output of that operation in a memory device to which it is communicatively coupled. A further hardware component can then, at a later time, access the memory device to retrieve and process the stored output. Hardware components can also initiate communications with input or output devices, and can operate on a resource (e.g., a collection of information).

The various operations of example methods described herein can be performed, at least partially, by processors that are temporarily configured (e.g., by software) or permanently configured to perform the relevant operations. Whether temporarily or permanently configured, such processors constitute processor-implemented components that operate to perform operations or functions described herein. As used herein. "processor-implemented component" refers to a hardware component implemented using processors.

Similarly, the methods described herein can be at least partially processor-implemented, with a particular processor or processors being an example of hardware. For example, at least some of the operations of a method can be performed by processors or processor-implemented components. Moreover, the processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via appropriate interfaces (e.g., an Application Program Interface (API)).

The performance of certain of the operations may be distributed among the processors, not only residing within a single machine, but deployed across a number of machines. In some example embodiments, the processors or processor-implemented components are located in a single geographic location (e.g., within a home environment, an office environment, or a server farm). In other example embodiments, the processors or processor-implemented components are distributed across a number of geographic locations.

Applications

Figure 7:
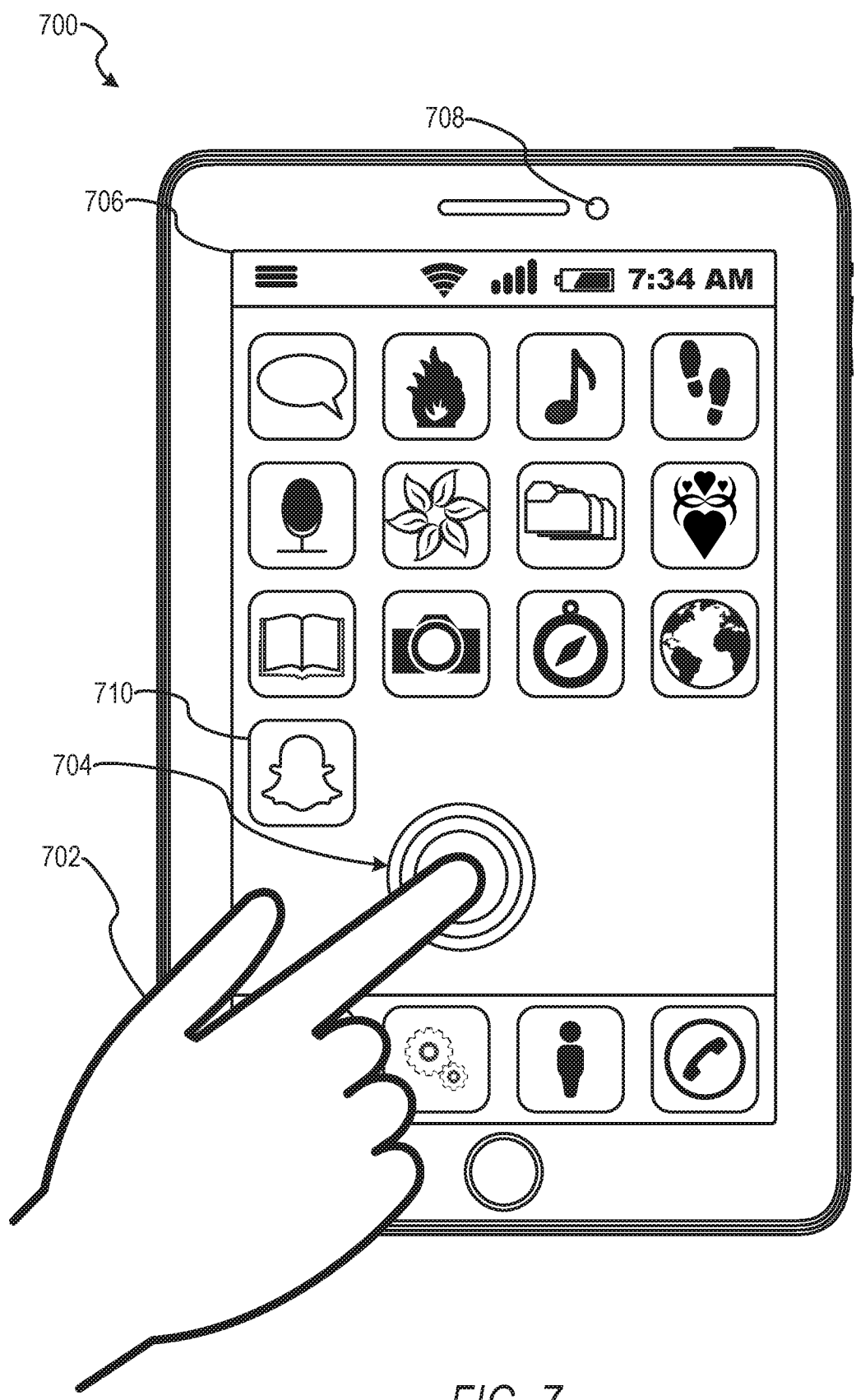
FIG. 7 is a user interface diagram depicting an example mobile device and mobile operating system interface, according to some example embodiments.

FIG. 7 illustrates an example mobile device 700 executing a mobile operating system (e.g., IOS™, ANDROID™, WINDOWS® Phone, or other mobile operating systems), consistent with some embodiments. In one embodiment, the mobile device 700 includes a touch screen operable to receive tactile data from a user 702. For instance, the user 702 may physically touch 704 the mobile device 700, and in response to the touch 704, the mobile device 700 may determine tactile data such as touch location, touch force, or gesture motion. In various example embodiments, the mobile device 700 displays a home screen 706 (e.g., Springboard on IOS™) operable to launch applications or otherwise manage various aspects of the mobile device 700. In some example embodiments, the home screen 706 provides status information such as battery life, connectivity, or other hardware statuses. The user 702 can activate user interface elements by touching 704 an area occupied by a respective user interface element. In this manner, the user 702 interacts with the applications of the mobile device 700. For example, touching 704 the area occupied by a particular icon included in the home screen 706 causes launching of an application corresponding to the particular icon.

The mobile device 700, as shown in FIG. 7, includes an imaging device 708. The imaging device 708 may be a camera or any other device coupled to the mobile device 700 capable of capturing a video stream or one or more successive images. The imaging device 708 may be triggered by an application, the social messaging system 130, or the content access system 160 or a selectable user interface element to initiate capture of an image, a video stream, or succession of frames and pass the video stream or succession of images to the content access system 160 for processing according to the one or more methods described in the present disclosure, to encrypt and securely store the image, video stream, or succession of frames at the content server.

Many varieties of applications (also referred to as "apps") can be executing on the mobile device 700, such as native applications (e.g., applications programmed in Objective-C. Swift. or another suitable language running on IOS™, or applications programmed in Java running on ANDROID™), mobile web applications (e.g., applications written in Hypertext Markup Language-5 (HTML5)), or hybrid applications (e.g., a native shell application that launches an HTML5 session). For example, the mobile device 700 includes a messaging app, an audio recording app, a camera app, a book reader app, a media app, a fitness app, a file management app, a location app, a browser app, a settings app, a contacts app, a telephone call app, or other apps (e.g., gaming apps, social networking apps, biometric monitoring apps). In another example, the mobile device 700 includes a social messaging app 710 such as SNAPCHAT® that, consistent with some embodiments, allows users to exchange ephemeral messages that include media content. In this example, the social messaging app 710 can incorporate aspects of embodiments described herein. For example, in some embodiments the social messaging app 710 includes an ephemeral gallery of media created by users of the social messaging app 710. These galleries may consist of videos or pictures posted by a user and made viewable by contacts (e.g., "friends") of the user. Alternatively, public galleries may be created by administrators of the social messaging app 710 consisting of media from any users of the app 710 (and accessible by all users). In yet another embodiment, the social messaging app 710 may include a "magazine" feature which consists of articles and other content generated by publishers on the social messaging application's platform and accessible by any users. Any of these environments or platforms may be used to implement concepts of one or more embodiments of the present disclosure.

In some embodiments, an ephemeral message system may include messages having ephemeral video clips or images which are deleted following a deletion trigger event such as a viewing time or viewing completion. In such embodiments, a device implementing the content access system 160 may encrypt the ephemeral video clip, as the ephemeral video clip is being captured by the device, or afterward, and transmit the ephemeral video clip to another device or the content server using the ephemeral message system or the content access system 160.

Software Architecture

Figure 8:
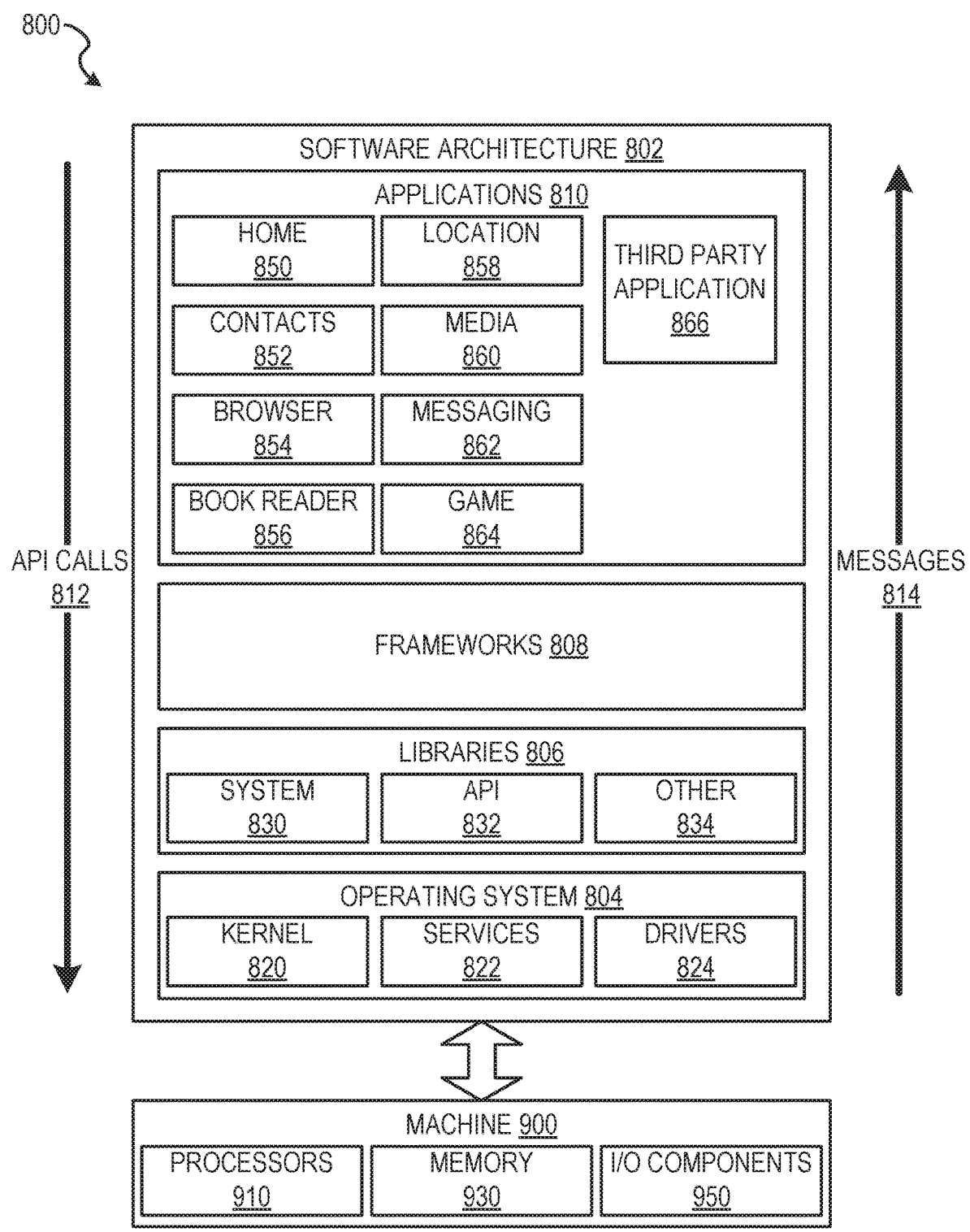
FIG. 8 is a block diagram illustrating an example of a software architecture that may be installed on a machine, according to some example embodiments.

FIG. 8 is a block diagram 800 illustrating an architecture of software 802, which can be installed on the devices described above. FIG. 8 is merely a non-limiting example of a software architecture, and it will be appreciated that many other architectures can be implemented to facilitate the functionality described herein. In various embodiments, the software 802 is implemented by hardware such as machine a 900 of FIG. 9 that includes processors 910, memory 930, and I/O components 950. In this example architecture, the software 802 can be conceptualized as a stack of layers where each layer may provide a particular functionality. For example, the software 802 includes layers such as an operating system 804, libraries 806, frameworks 808, and applications 810. Operationally, the applications 810 invoke application programming interface (API) calls 812 through the software stack and receive messages 814 in response to the API calls 812, consistent with some embodiments.

In various implementations, the operating system 804 manages hardware resources and provides common services. The operating system 804 includes, for example, a kernel 820, services 822, and drivers 824. The kernel 820 acts as an abstraction layer between the hardware and the other software layers consistent with some embodiments. For example, the kernel 820 provides memory management, processor management (e.g., scheduling), component management, networking, and security settings, among other functionality. The services 822 can provide other common services for the other software layers. The drivers 824 are responsible for controlling or interfacing with the underlying hardware, according to some embodiments. For instance, the drivers 824 can include display drivers, camera drivers, BLUETOOTH® drivers, flash memory drivers, serial communication drivers (e.g., Universal Serial Bus (USB) drivers), WI-FI® drivers, audio drivers, power management drivers, and so forth.

In some embodiments, the libraries 806 provide a low-level common infrastructure utilized by the applications 810. The libraries 806 can include system libraries 830 (e.g., C standard library) that can provide functions such as memory allocation functions, string manipulation functions, mathematic functions, and the like. In addition, the libraries 806 can include API libraries 832 such as media libraries (e.g., libraries to support presentation and manipulation of various media formats such as Moving Picture Experts Group-4 (MPEG4), Advanced Video Coding (H.264 or AVC). Moving Picture Experts Group Layer-3 (MP3). Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 806 can also include a wide variety of other libraries 834 to provide many other APIs to the applications 810.

The frameworks 808 provide a high-level common infrastructure that can be utilized by the applications 810, according to some embodiments. For example, the frameworks 808 provide various graphic user interface (GUI) functions, high-level resource management, high-level location services, and so forth. The frameworks 808 can provide a broad spectrum of other APIs that can be utilized by the applications 810, some of which may be specific to a particular operating system or platform.

In an example embodiment, the applications 810 include a home application 850, a contacts application 852, a browser application 854, a book reader application 856, a location application 858, a media application 860, a messaging application 862, a game application 864, and a broad assortment of other applications such as a third party application 866. According to some embodiments, the applications 810 are programs that execute functions defined in the programs. Various programming languages can be employed to create the applications 810, structured in a variety of manners, such as object-oriented programming languages (e.g., Objective-C. Java, or C++) or procedural programming languages (e.g., C or assembly language). In a specific example, the third-party application 866 (e.g., an application developed using the ANDROID™ or IOS™ software development kit (SDK) by an entity other than the vendor of the particular platform) may be mobile software running on a mobile operating system such as IOS™, ANDROID™, WINDOWS® PHONE, or another mobile operating system. In this example, the third-party application 866 can invoke the API calls 812 provided by the operating system 804 to facilitate functionality described herein.

Example Machine Architecture and Machine-Readable Medium

Figure 9:
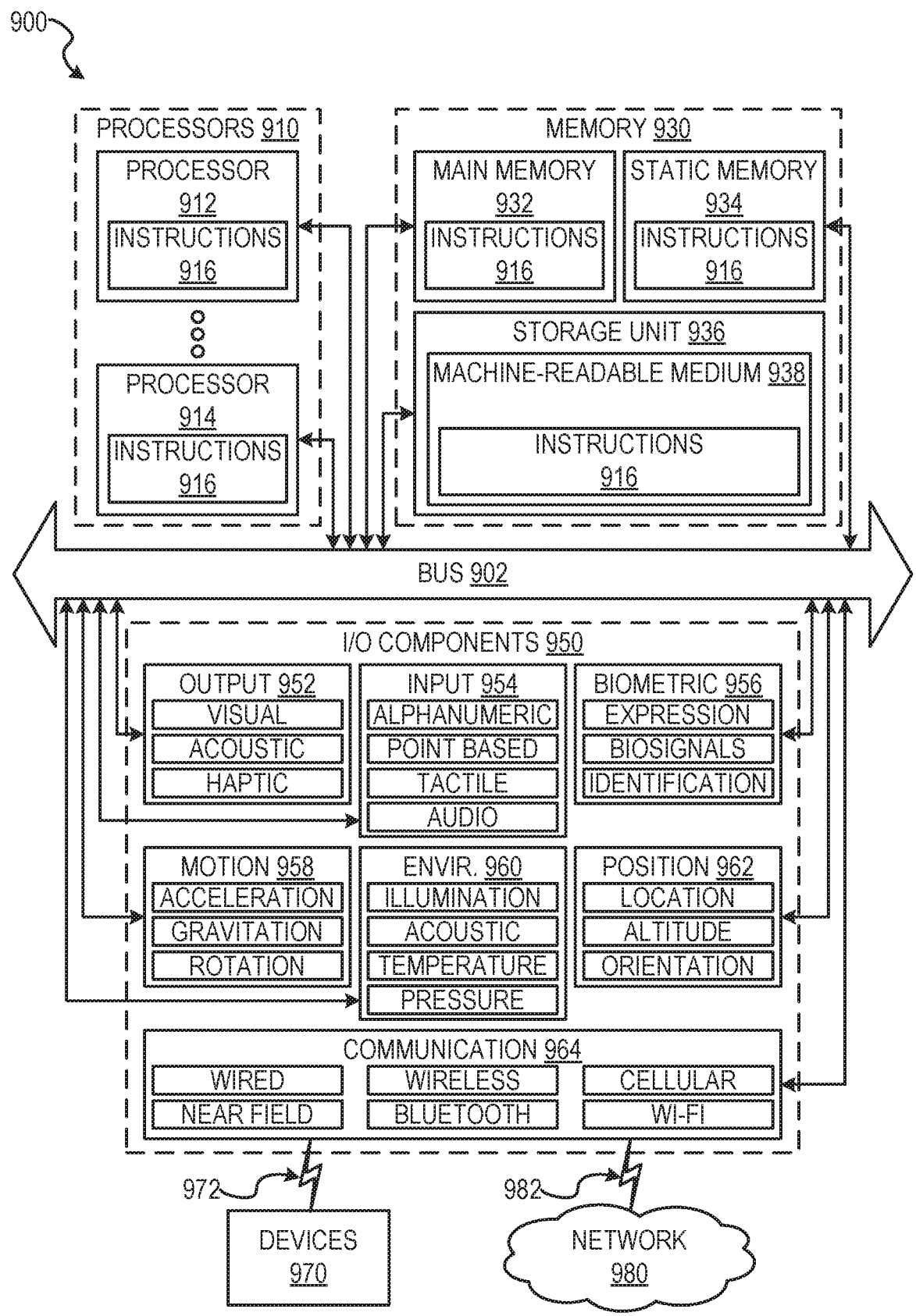
FIG. 9 is a block diagram presenting a diagrammatic representation of a machine in the form of a computer system within which a set of instructions may be executed for causing the machine to perform any of the methodologies discussed herein, according to an example embodiment.

FIG. 9 is a block diagram illustrating components of a machine 900, according to some embodiments, able to read instructions (e.g., processor executable instructions) from a machine-readable medium (e.g., a non-transitory processor-readable storage medium or processor-readable storage device) and perform any of the methodologies discussed herein. Specifically, FIG. 9 shows a diagrammatic representation of the machine 900 in the example form of a computer system, within which instructions 916 (e.g., software, a program, an application, an applet, an app, or other executable code) for causing the machine 900 to perform any of the methodologies discussed herein can be executed. In alternative embodiments, the machine 900 operates as a stand-alone device or can be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any of the methodologies discussed herein.

In various embodiments, the machine 900 comprises processors 910, memory 930, and I/O components 950, which can be configured to communicate with each other via a bus 902. In an example embodiment, the processors 910 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) include, for example, a processor 912 and a processor 914 that may execute the instructions 916. The term "processor" is intended to include multi-core processors that may comprise two or more independent processors (also referred to as "cores") that can execute instructions 916 contemporaneously. Although FIG. 9 shows multiple processors 910, the machine 900 may include a single processor with a single core, a single processor with multiple cores (e.g., a multi-core processor), multiple processors with a single core, multiple processors with multiples cores, or any combination thereof.

The memory 930 comprises a main memory 932, a static memory 934, and a storage unit 936 accessible to the processors 910 via the bus 902, according to some embodiments. The storage unit 936 can include a machine-readable medium 938 on which are stored the instructions 916 embodying any of the methodologies or functions described herein. The instructions 916 can also reside, completely or at least partially, within the main memory 932, within the static memory 934, within at least one of the processors 910 (e.g., within the processor's cache memory), or any suitable combination thereof, during execution thereof by the machine 900. Accordingly, in various embodiments, the main memory 932, the static memory 934, and the processors 910 are considered machine-readable media 938.

As used herein, the term "memory" refers to a machine-readable medium 938 able to store data temporarily or permanently and may be taken to include, but not be limited to, random-access memory (RAM), read-only memory (ROM), buffer memory, flash memory, and cache memory. While the machine-readable medium 938 is shown in an example embodiment to be a single medium, the term "machine-readable medium" should be taken to include a single medium or multiple media (e.g., a centralized or distributed database, or associated caches and servers) able to store the instructions 916. The term "machine-readable medium" shall also be taken to include any medium, or combination of multiple media, that is capable of storing instructions (e.g., instructions 916) for execution by a machine (e.g., machine 900), such that the instructions, when executed by processors of the machine 900 (e.g., processors 910), cause the machine 900 to perform any of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 950 include a wide variety of components to receive input, provide output, produce output, transmit information, exchange information, capture measurements, and so on. In general, it will be appreciated that the I/O components 950 can include many other components that are not shown in FIG. 9. The I/O components 950 are grouped according to functionality merely for simplifying the following discussion, and the grouping is in no way limiting. In various example embodiments, the I/O components 950 include output components 952 and input components 954. The output components 952 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 954 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 950 include biometric components 956, motion components 958, environmental components 960, or position components 962, among a wide array of other components. For example, the biometric components 956 include components to detect expressions (e.g., hand expressions, facial expressions, vocal expressions, body gestures, or mouth gestures), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 958 include acceleration sensor components (e.g., accelerometer), gravitation sensor components, rotation sensor components (e.g., gyroscope), and so forth. The environmental components 960 include, for example, illumination sensor components (e.g., photometer), temperature sensor components (e.g., thermometers that detect ambient temperature), humidity sensor components, pressure sensor components (e.g., barometer), acoustic sensor components (e.g., microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 962 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 950 may include communication components 964 operable to couple the machine 900 to a network 980 or devices 970 via a coupling 982 and a coupling 972, respectively. For example, the communication components 964 include a network interface component or another suitable device to interface with the network 980. In further examples, communication components 964 include wired communication components, wireless communication components, cellular communication components, Near Field Communication (NFC) components, BLUETOOTH® components (e.g., BLUETOOTH® Low Energy), WI-FI® components, and other communication components to provide communication via other modalities. The devices 970 may be another machine or any of a wide variety of peripheral devices (e.g., a peripheral device coupled via a Universal Serial Bus (USB)).

Moreover, in some embodiments, the communication components 964 detect identifiers or include components operable to detect identifiers. For example, the communication components 964 include Radio Frequency Identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code. Data Matrix, Dataglyph, MaxiCode, PDF417, Ultra Code. Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 964, such as location via Internet Protocol (IP) geo-location, location via WI-FI signal triangulation, location via detecting a BLUETOOTH® or NFC beacon signal that may indicate a particular location, and so forth.

Transmission Medium

In various example embodiments, portions of the network 980 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI® network, another type of network, or a combination of two or more such networks. For example, the network 980 or a portion of the network 980 may include a wireless or cellular network, and the coupling 982 may be a Code Division Multiple Access (CDMA) connection, a Global System for Mobile communications (GSM) connection, or another type of cellular or wireless coupling. In this example, the coupling 982 can implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks. Universal Mobile Telecommunications System (UMTS). High Speed Packet Access (HSPA), Worldwide Interoperability for Microwave Access (WiMAX). Long Term Evolution (LTE) standard, others defined by various standard-setting organizations, other long range protocols, or other data transfer technology.

In example embodiments, the instructions 916 are transmitted or received over the network 980 using a transmission medium via a network interface device (e.g., a network interface component included in the communication components 964) and utilizing any one of a number of well-known transfer protocols (e.g., Hypertext Transfer Protocol (HTTP)). Similarly, in other example embodiments, the instructions 916 are transmitted or received using a transmission medium via the coupling 972 (e.g., a peer-to-peer coupling) to the devices 970. The term "transmission medium" shall be taken to include any intangible medium that is capable of storing, encoding, or carrying the instructions 916 for execution by the machine 900, and includes digital or analog communications signals or other intangible media to facilitate communication of such software.

Furthermore, the machine-readable medium 938 is non-transitory (in other words, not having any transitory signals) in that it does not embody a propagating signal. However, labeling the machine-readable medium 938 "non-transitory" should not be construed to mean that the medium is incapable of movement; the medium should be considered as being transportable from one physical location to another. Additionally, since the machine-readable medium 938 is tangible, the medium may be considered to be a machine-readable device.

Language

Throughout this specification, plural instances may implement components, operations, or structures described as a single instance. Although individual operations of methods are illustrated and described as separate operations, individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, components, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method, comprising:
    generating, by one or more processors, a first authentication credential, the first authentication credential being associated with a user, accessing a second authentication credential stored on a key server using the first authentication credential;
    generating an authentication token and an encryption token using the second authentication credential;
    accessing, a plurality of unencrypted content elements using the generated authentication token;
    encrypting one or more unencrypted content elements of the plurality of unencrypted content elements using one or more content keys of a plurality of content keys, associated with the one or more unencrypted content elements to generate a plurality of encrypted content elements;
    encrypting the plurality of content keys to generate a plurality of encrypted content keys using a master key;
    encrypting the master key to generate an encrypted master key using the generated encryption token; and
    storing the plurality of encrypted content elements in a data store.

2. The method of claim 1, wherein the first authentication credential is a user selected login credential received in response to a user interface element prompting entry of an authentication credential.

3. The method of claim 1, wherein accessing the second authentication credential on the key server further comprises:
    based on receiving the first authentication credential, transmitting an indication of the first authentication credential to a content server;
    receiving a session credential from the content server, the session credential indicating initiation of a present session of the user device in response to receiving the first authentication credential; and
    transmitting the session credential and an indication of the first authentication credential to the key server, access to the second authentication credential being established in response to the session credential and the indication being received by the key server.

4. The method of claim 1, further comprising:
    in response to receiving the first authentication credential, accessing a value at the key server, the value being a random string exceeding a threshold length and being associated with the first authentication credential; and
    generating the encryption token and the authentication token, the encryption token being a token for encrypting and decrypting an encryption key generated at the user device based on the value, the authentication token being a token for generating a challenge response.

5. The method of claim 4, wherein the value comprises a first value and a second value, each of the first value and the second value being a random string exceeding a threshold length.

6. The method of claim 5, wherein generating the encryption token and the authentication token further comprises:
    generating the authentication token by applying a first key derivation function and a first work factor to the first value and the first authentication credential; and
    generating the encryption token by applying a second key derivation function and a second work factor to the second value and the first authentication credential.

7. The method of claim 1 further comprising:
    identifying one or more characteristics associated with each unencrypted content element; and
    based on the identified characteristics, determining a respective content encryption status associated with each unencrypted content element.

8. A system, comprising:
    one or more processors; and
    a processor-readable storage device coupled to the one or more processors, the processor-readable storage device storing processor-executable instructions that, when executed by the one or more processors, cause the one or more processors to perform operations comprising:
    generating, by one or more processors, a first authentication credential, the first authentication credential being associated with a user;
    accessing a second authentication credential stored on a key server using the first authentication credential;
    generating an authentication token and an encryption token using the second authentication credential;
    accessing, a plurality of unencrypted content elements using the generated authentication token;

encrypting one or more unencrypted content elements of the plurality of unencrypted content elements using one or more content keys of a plurality of content keys, associated with the one or more unencrypted content elements to generate a plurality of encrypted content elements;

encrypting the plurality of content keys to generate a plurality of encrypted content keys using a master key;

encrypting the master key to generate an encrypted master key using the generated encryption token; and storing the plurality of encrypted content elements in a data store.

9. The system of claim 8, wherein the first authentication credential is a user selected login credential received in response to a user interface element prompting entry of an authentication credential.

10. The system of claim 8, wherein accessing the second authentication credential on the key server further comprises:

based on receiving the first authentication credential, transmitting an indication of the first authentication credential to a content server;

receiving a session credential from the content server, the session credential indicating initiation of a present session of the user device in response to receiving the first authentication credential; and transmitting the session credential and an indication of the first authentication credential to the key server, access to the second authentication credential being established in response to the session credential and the indication being received by the key server.

11. The system of claim 8, further comprising:

in response to receiving the first authentication credential, accessing a value at the key server, the value being a random string exceeding a threshold length and being associated with the first authentication credential; and generating the encryption token and the authentication token, the encryption token being a token for encrypting and decrypting an encryption key generated at the user device based on the value, the authentication token being a token for generating a challenge response.

12. The system of claim 11, wherein the value comprises a first value and a second value, each of the first value and the second value being a random string exceeding a threshold length.

13. The system of claim 12, wherein generating the encryption token and the authentication token further comprises:

generating the authentication token by applying a first key derivation function and a first work factor to the first value and the first authentication credential; and generating the encryption token by applying a second key derivation function and a second work factor to the second value and the first authentication credential.

14. The system of claim 8 further comprising:

identifying one or more characteristics associated with each unencrypted content element; and based on the identified characteristics, determining a respective content encryption status associated with each unencrypted content element.

15. A processor-readable storage device coupled to one or more processors, the processor-readable storage device storing processor-executable instructions that, when executed by the one ore processors, cause the one or more processors to perform operations comprising:

generating, by one or more processors, a first authentication credential, the first authentication credential being associated with a user;

accessing a second authentication credential stored on a key server using the first authentication credential;

generating an authentication token and an encryption token using the second authentication credential;

accessing, a plurality of unencrypted content elements using the generated authentication token;

encrypting one or more unencrypted content elements of the plurality of unencrypted content elements using one or more content keys of a plurality of content keys, associated with the one or more unencrypted content elements to generate a plurality of encrypted content elements;

encrypting the plurality of content keys to generate a plurality of encrypted content keys using a master key;

encrypting the master key to generate an encrypted master key using the generated encryption token; and storing the plurality of encrypted content elements in a data store.

16. The processor-readable storage device of claim 15, wherein the first authentication credential is a user selected login credential received in response to a user interface element prompting entry of an authentication credential.

17. The processor-readable storage device of claim 15, wherein accessing the second authentication credential on the key server further comprises:

based on receiving the first authentication credential, transmitting an indication of the first authentication credential to a content server;

receiving a session credential from the content server, the session credential indicating initiation of a present session of the user device in response to receiving the first authentication credential; and transmitting the session credential and an indication of the first authentication credential to the key server, access to the second authentication credential being established in response to the session credential and the indication being received by the key server.

18. The processor-readable storage device of claim 15, further comprising:

in response to receiving the first authentication credential, accessing a value at the key server, the value being a random string exceeding a threshold length and being associated with the first authentication credential; and generating the encryption token and the authentication token, the encryption token being a token for encrypting and decrypting an encryption key generated at the user device based on the value, the authentication token being a token for generating a challenge response.

19. The system of claim 18, wherein the value comprises a first value and a second value, each of the first value and the second value being a random string exceeding a threshold length.

20. The system of claim 19, wherein generating the encryption token and the authentication token further comprises:

generating the authentication token by applying a first key derivation function and a first work factor to the first value and the first authentication credential; and generating the encryption token by applying a second key derivation function and a second work factor to the second value and the first authentication credential.

\* \* \* \* \*